(12) United States Patent
Fisher et al.

(10) Patent No.: US 7,815,413 B2
(45) Date of Patent: Oct. 19, 2010

(54) METHOD OF STOWING WHEELCHAIR LIFT

(75) Inventors: Steven Fisher, Rosamond, CA (US); Miguel Monge, Palmdale, CA (US)

(73) Assignee: Ricon Corp., Panorama City, CA (US)

( * ) Notice: Subject to any disclaimer, the term of this patent is extended or adjusted under 35 U.S.C. 154(b) by 0 days.

(21) Appl. No.: 12/267,052

(22) Filed: Nov. 7, 2008

(65) Prior Publication Data

US 2009/0129906 A1 May 21, 2009

Related U.S. Application Data

(63) Continuation of application No. 11/347,360, filed on Feb. 3, 2006, now Pat. No. 7,467,917.

(51) Int. Cl.
*B60P 1/44* (2006.01)
(52) U.S. Cl. ...................... 414/812; 414/921
(58) Field of Classification Search .............. 414/921, 414/812; 187/200
See application file for complete search history.

(56) References Cited

U.S. PATENT DOCUMENTS

| | | |
|---|---|---|
| 3,651,965 A | 3/1972 | Simonelli et al. |
| 4,015,725 A | 4/1977 | Ryan et al. |
| 4,140,230 A | 2/1979 | Pearson |
| 4,252,491 A | 2/1981 | Hock |
| 4,534,450 A | 8/1985 | Savaria |
| 4,808,056 A | 2/1989 | Oshima |
| 5,228,538 A | 7/1993 | Tremblay |
| 5,228,539 A | 7/1993 | Wertheim |
| 5,234,311 A | 8/1993 | Loduha, Jr. et al. |
| 5,253,973 A | 10/1993 | Fretwell |
| 5,308,215 A | 5/1994 | Saucier |
| 5,373,915 A | 12/1994 | Tremblay |
| 5,393,192 A | 2/1995 | Hall et al. |
| 5,401,135 A | 3/1995 | Stoen et al. |
| 5,425,615 A | 6/1995 | Hall et al. |
| 5,445,488 A | 8/1995 | Saucier et al. |
| 5,542,811 A | 8/1996 | Vartanian |

(Continued)

FOREIGN PATENT DOCUMENTS

CA 1143713 2/1983

(Continued)

OTHER PUBLICATIONS

Vangater II Wheelchair Lifts, Brochure 32243, The Braun Corporation, 2005.

*Primary Examiner*—James Keenan
(74) *Attorney, Agent, or Firm*—The Webb Law Firm

(57) ABSTRACT

A wheelchair lift for use in conjunction with a vehicle having a floor. The lift includes a power-actuating system, a platform assembly having first and second platform sections, a linking assembly having first and second vertical arms connected to the platform assembly, and first and second fold-facilitating links connecting the first and second vertical arms, respectively, to the first and second platform sections. The linking assembly connects the power-actuating system to the platform assembly. During a folding process, the first and second fold-facilitating links cause the first platform section to pivot with respect to the second platform section and the first vertical arm to move with respect to the second vertical arm.

5 Claims, 20 Drawing Sheets

U.S. PATENT DOCUMENTS

| | | |
|---|---|---|
| 5,556,250 A | 9/1996 | Fretwell et al. |
| 5,564,884 A | 10/1996 | Farsai |
| 5,605,431 A | 2/1997 | Saucier et al. |
| 5,636,399 A | 6/1997 | Tremblay et al. |
| 5,672,041 A | 9/1997 | Ringdahl et al. |
| 5,676,515 A | 10/1997 | Haustein |
| 5,832,555 A | 11/1998 | Saucier et al. |
| 5,944,473 A | 8/1999 | Saucier et al. |
| 6,042,327 A | 3/2000 | DeLeo et al. |
| 6,043,741 A | 3/2000 | Whitmarsh |
| 6,062,805 A | 5/2000 | Tremblay et al. |
| 6,086,314 A | 7/2000 | Savaria |
| 6,102,648 A | 8/2000 | Fretwell et al. |
| 6,173,737 B1 | 1/2001 | Saucier |
| 6,179,545 B1 | 1/2001 | Petersen, Jr. et al. |
| 6,203,266 B1 | 3/2001 | Savaria et al. |
| 6,236,905 B1 | 5/2001 | Whitmarsh |
| 6,293,748 B1 | 9/2001 | Savaria |
| 6,379,102 B1 | 4/2002 | Kameda |
| 6,585,474 B1 | 7/2003 | Kameda |
| 6,698,998 B2 | 3/2004 | Koretsky |
| 6,802,095 B1 | 10/2004 | Whitmarsh et al. |
| 6,971,967 B2 | 12/2005 | Whitmarsh |
| 7,001,132 B2 | 2/2006 | Koretsky et al. |
| 7,445,416 B2 * | 11/2008 | O'Leary et al. ............. 414/546 |
| 2004/0028513 A1 | 2/2004 | Reynolds |

FOREIGN PATENT DOCUMENTS

| | | |
|---|---|---|
| EP | 0629524 A1 | 12/1994 |
| GB | 2224992 A | 5/1990 |

* cited by examiner

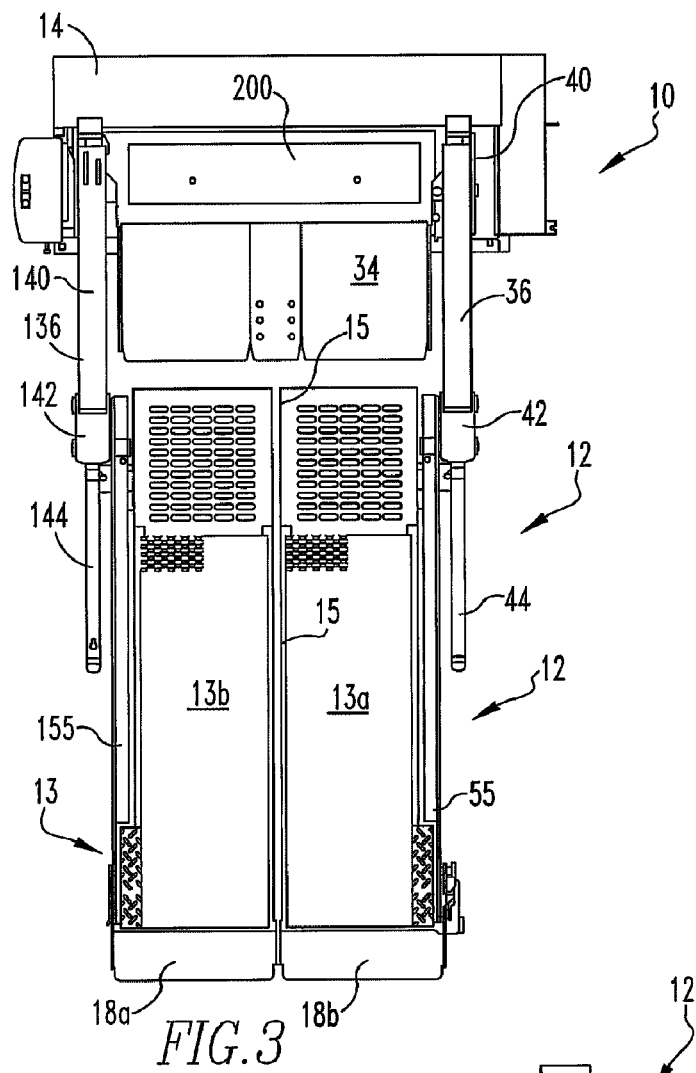
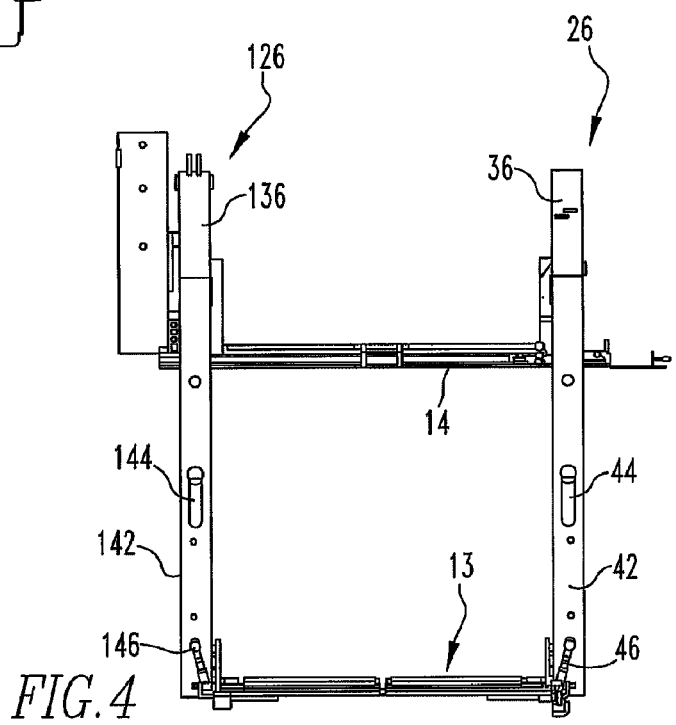

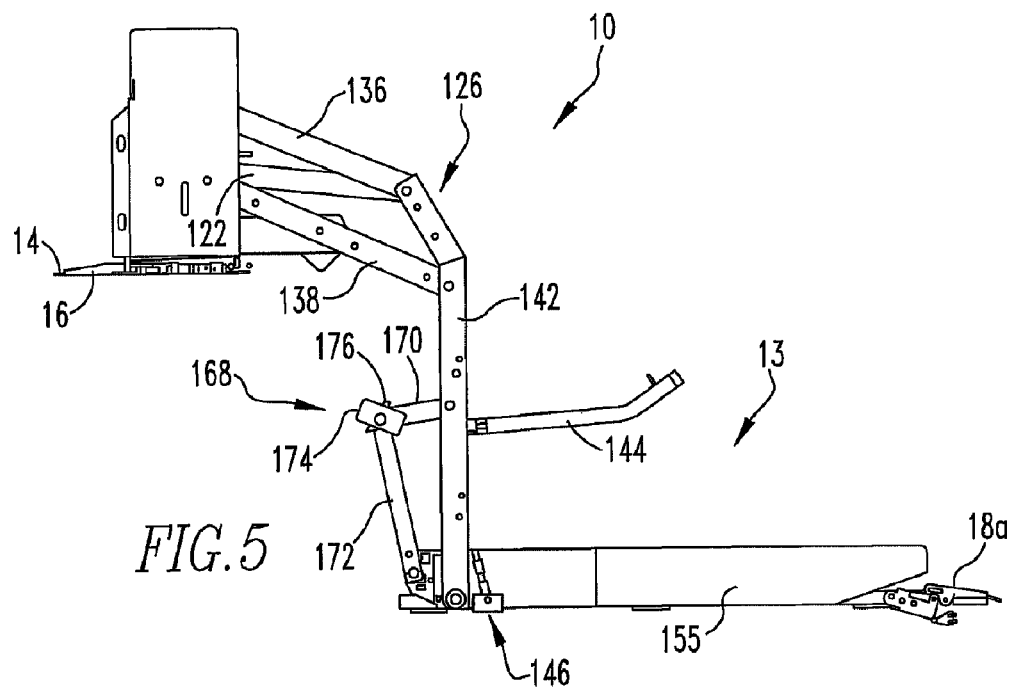
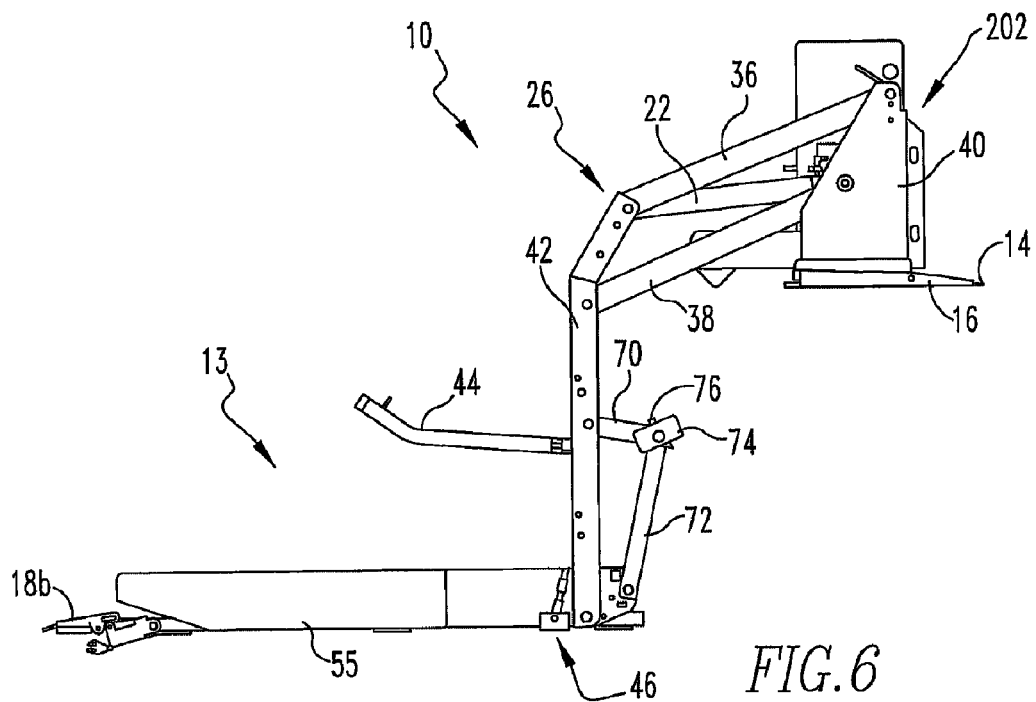

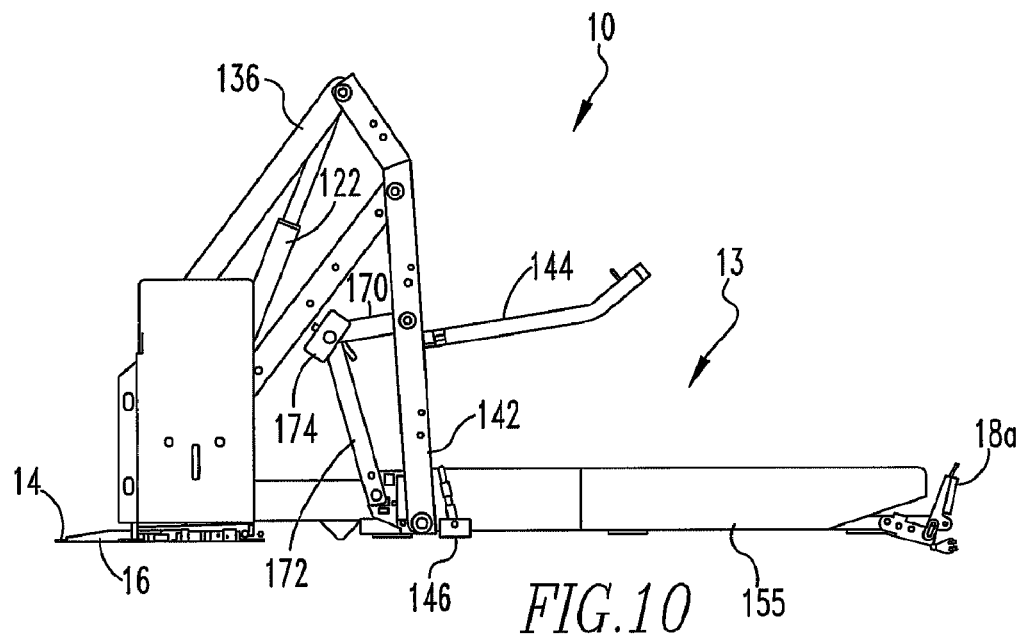
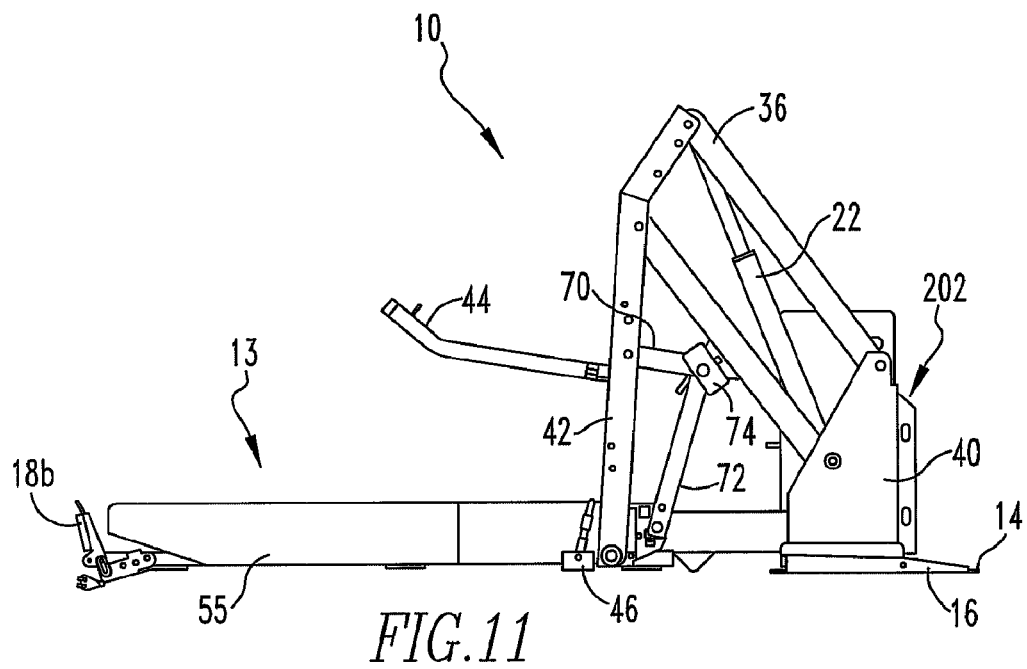

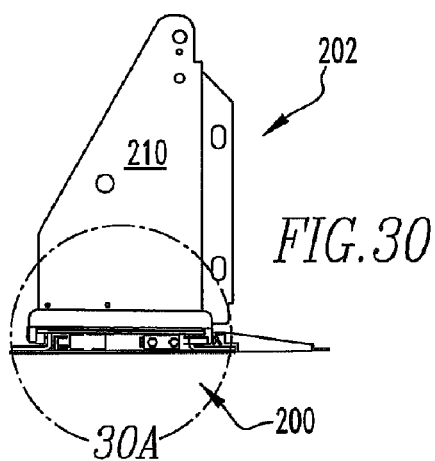
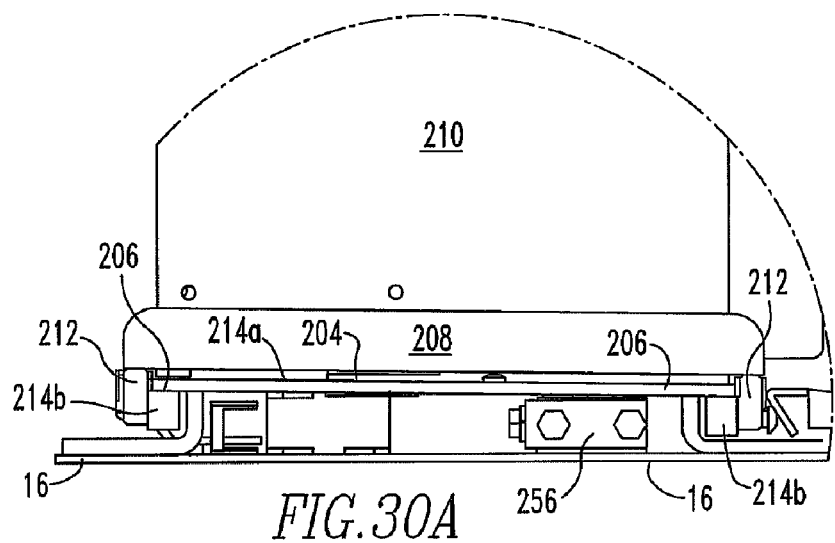
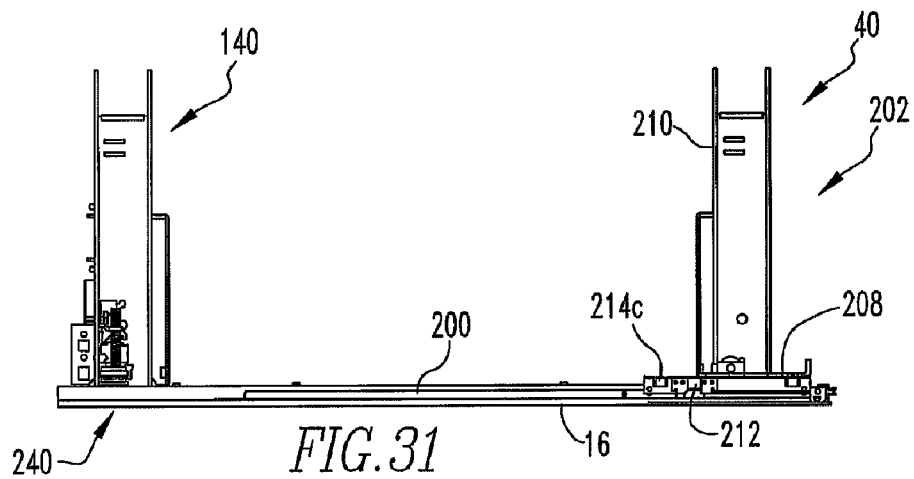

METHOD OF STOWING WHEELCHAIR LIFT

CROSS REFERENCE TO RELATED APPLICATIONS

This application is a continuation of co-pending U.S. patent application Ser. No. 11/347,360, filed Feb. 3, 2006.

BACKGROUND OF THE INVENTION

Field of the Invention

The present invention relates to a lift assembly for aiding wheelchair users to get into and out of a van or the like.

SUMMARY OF THE INVENTION

A lift assembly of this type comprises a platform laterally supported by an armature and carried from a vertical stored position inside the vehicle to a horizontal position exteriorly of the vehicle level with the vehicle floor and to a ground position.

The user wheels himself onto the platform and actuates means to displace the platform from the vehicle level to the ground or inversely.

This type of known lift assembly (see U.S. Pat. No. 3,651,965 dated Mar. 28, 1972 to Clever Industries, Inc.) is stored in the vehicle but uses a relatively large percentage of the floor area; and, moreover, the platform 4, when in the stored position, obstructs the door opening, thus preventing an ambulatory person from using it. Also, the hydraulic systems used to raise or lower the platform are generally bulky and complex.

Other types of lifts have attempted to solve these problems. See, for example, U.S. Pat. Nos. 6,802,095; 6,379,102; 6,585,474; 6,086,314; 6,062,805; 5,944,473; 5,605,431; 5,556,250; and 5,445,488, all of which are incorporated herein in their entireties by reference.

Therefore, a need exists for a lift assembly mounted in a vehicle and foldable into a compact position within the latter.

In accordance with a preferred embodiment of the present invention, there is provided a wheelchair lift for use in conjunction with a vehicle having a floor. The lift includes a power-actuating system, a platform assembly having first and second platform sections, a linking assembly having first and second vertical arms connected to the platform assembly, and first and second fold-facilitating links connecting the first and second vertical arms, respectively, to the first and second platform sections. The linking assembly connects the power-actuating system to the platform assembly. During a folding process, the first and second fold-facilitating links cause the first platform section to pivot with respect to the second platform section and the first vertical arm to move with respect to the second vertical arm.

In a preferred embodiment, the first and second sections of the platform each have a top surface and a bottom surface. In a fully extended configuration, the bottom surfaces of the first and second sections face the same direction and in a stowed position, the bottom surface of the first section faces the bottom surface of the second section.

In accordance with another preferred embodiment of the present invention, there is provided a method of stowing a wheelchair lift in a vehicle having a floor. The method includes the steps of providing a wheelchair lift having a power-actuating system, a platform assembly and a linking assembly with first and second vertical arms connected to the platform assembly connecting the power-actuating system to the platform assembly, and moving the platform assembly from a floor level position to a stowed position while simultaneously folding the platform assembly along a longitudinally-oriented fold perpendicular to an extended edge of the vehicle floor. In a preferred embodiment, one of the vertical arms is pulled toward the other vertical arm during the folding process.

In accordance with yet another preferred embodiment of the present invention, there is provided a wheelchair lift for use in conjunction with a vehicle having a floor. The lift includes a power-actuating system, a platform assembly including first and second platform sections, a linking assembly having first and second vertical arms connected to the platform assembly connecting the power-actuating system to the platform assembly, and at least one fold-facilitating link disposed between the first vertical arm and the first platform section. At least one of the first and second vertical arms is movable toward the other vertical arm. During movement of at least one of the vertical arms toward the other vertical arm, the at least one fold-facilitating link causes the platform to fold along a longitudinally-oriented fold pivotally connecting the first and second platform sections.

In a preferred embodiment, the track assembly includes at least one track and the linking assembly includes at least one roller. The at least one roller and at least one track cooperate to make at least one of the first and second vertical arms movable. The linking assembly includes a movable tower to which the first vertical arm is secured, and the at least one roller is rotatably mounted on the movable tower. The movable tower defines a slot through which the at least one track extends.

BRIEF DESCRIPTION OF THE DRAWINGS

FIG. 3 is a top view of the powered wheelchair lift of FIG. 1 in the ground level position;

FIG. 4 is a front view of the powered wheelchair lift of FIG. 1 in the ground level position;

FIG. 5 is a right side view of the powered wheelchair lift of FIG. 1 in the ground level position;

FIG. 6 is a left side view of the powered wheelchair lift of FIG. 1 in the ground level position;

FIG. 10 is a right side view of the powered wheelchair lift of FIG. 1 in the floor level position;

FIG. 11 is a left side view of the powered wheelchair lift of FIG. 1 in the floor level position;

FIG. 30 is a left side view of the track assembly and movable tower;

FIG. 30a is a detailed side view of the interaction of the track assembly and movable tower;

FIG. 31 is a front view of the track assembly and movable tower;

DESCRIPTION OF THE PREFERRED EMBODIMENTS

Although specific embodiments of the present invention will now be described with reference to the drawings, it should be understood that such embodiments are by way of example only and are merely illustrative of but a small number of the many possible specific embodiments which can represent applications of the principles of the present invention. Various changes and modifications obvious to one skilled in the art to which the present invention pertains are deemed to be within the spirit, scope, and contemplation of the present invention as further defined in the appended claims.

Figure 1:
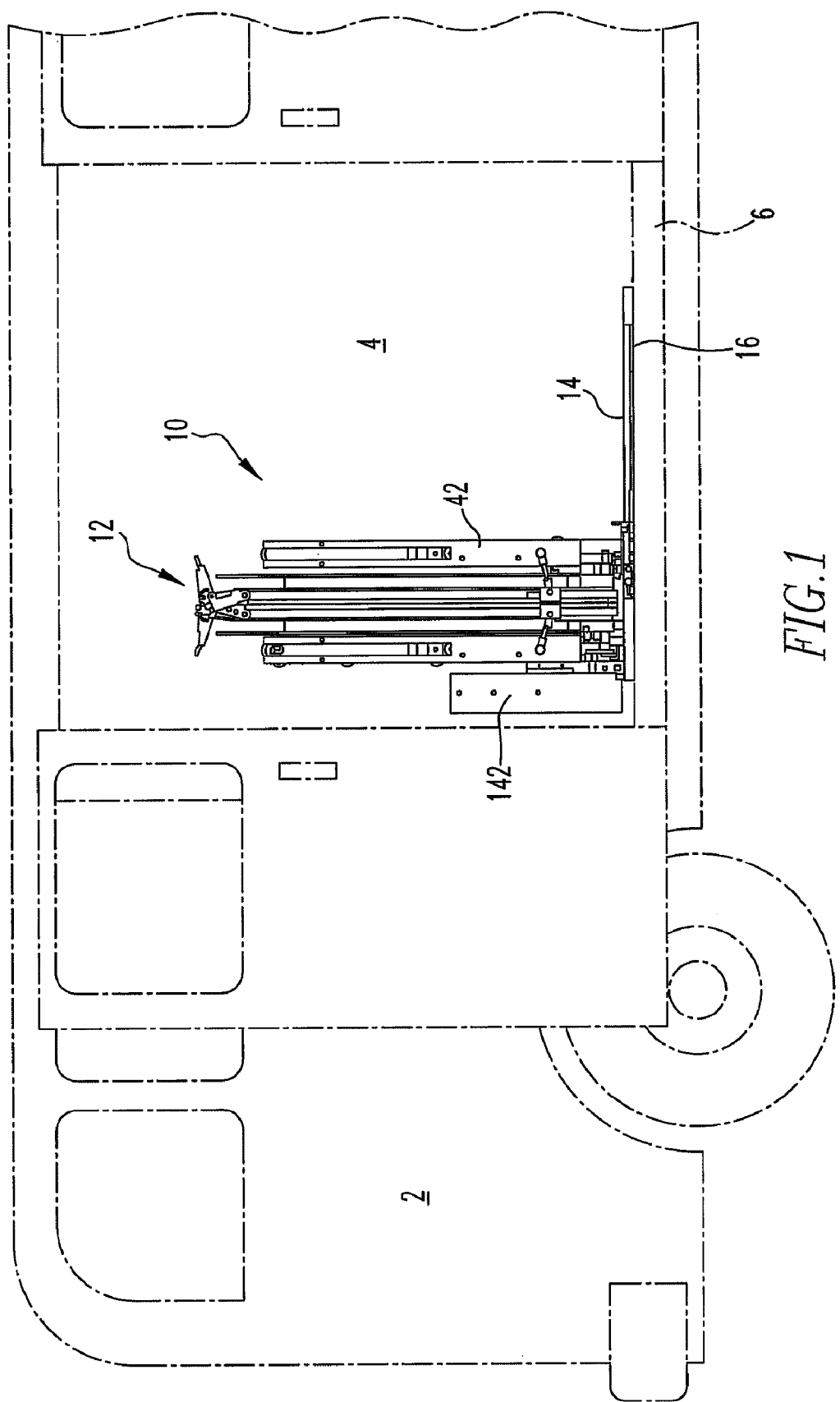
FIG. 1 is an illustrative view of the present invention, a powered wheelchair lift mounted in a vehicle, showing a foldable platform assembly in a stowed position.

Referring to FIG. 1, there is depicted at 10 the powered wheelchair lift of the present invention in its stowed position where a foldable platform assembly 12 is fully folded and stowed. The wheelchair lift 10 is installed inside a vehicle 2 (shown in dashed lines) adjacent an opening 4, such as a side door of the vehicle 2. However, it is also within the spirit and scope of the present invention to install the wheelchair lift 10 adjacent to a rear door opening (not shown) or any other opening of the vehicle 2. The lift 10 is firmly secured on the doorway of the vehicle 2 by a mounting assembly 14 which includes an anchoring plate 16 that is secured on a vehicle floor 6 by conventional means.

Referring to FIGS. 2-6, there is depicted a wheelchair lift 10, where the foldable platform assembly 12 is in a ground level position with outer roll stops 18a and 18b fully opened that allows a person in a wheelchair (not shown) to roll off the platform assembly 12 to the ground level (outside of the vehicle) and inversely. The outer roll stops 18a and 18b are self-engaged mechanisms for preventing the wheelchair from rolling off the front of the platform assembly before the platform assembly reaches the ground level position as shown.

Figure 34:
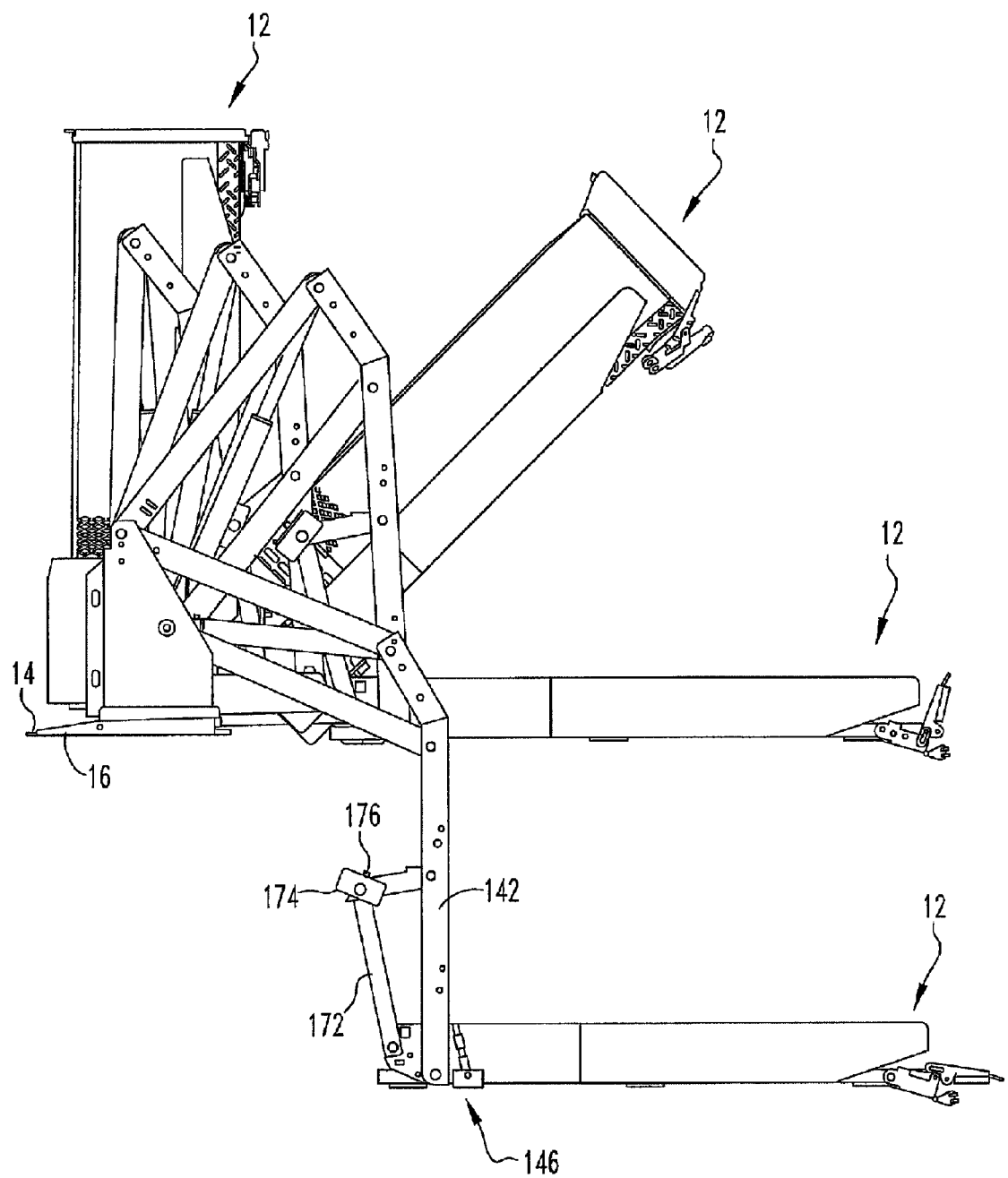
FIG. 34 is a right side view of the powered wheelchair lift of FIG. 1 showing the platform assembly in the ground level, floor level, mid-stow and stowed positions.

The platform assembly 12 can be lifted upwardly and downwardly between a stowed position (see FIGS. 17-21) and a fully extended configuration (see FIGS. 2-11) by a power-actuating system. The fully extended configuration includes both a floor level position (see FIGS. 7-11) and the ground level position (see FIGS. 2-6). FIGS. 12-16 show the platform assembly 12 in what is referred to herein as a mid-stow position, between the floor level and stowed positions. FIG. 34 shows the platform assembly in the ground level position, floor level position, mid-stow position, and stowed position.

The actuating system may be controlled electrically, hydraulically or in any other conventional way known to one skilled in the art. For demonstration purposes only, a hydraulic actuating system is described herewith. The hydraulic actuating system includes a hydraulic pump (not shown), a hydraulic power unit (not shown), and hydraulic cylinders 22 and 122. In an alternative embodiment the hydraulic actuating system can include a single hydraulic cylinder.

The hydraulic cylinders 22 and 122 are each mounted in one of two relative parallelogram-actuating linkage structures 26 and 126 which are mounted to a track assembly 200, which includes the anchoring plate 16. The track assembly 200 will be described more fully hereinbelow.

The platform assembly 12 includes a platform 13 that comprises a substantially flat and rigid surface made of first and second sections 13a and 13b having a combined area sufficient to support a wheel chair. The first and second sections 13a and 13b are pivotally connected along their inner longitudinally adjacent edges (which is perpendicular to an extended edge of the vehicle floor). In a preferred embodiment, the platform sections 13a and 13b are connected via hinges 15 (as shown in FIG. 3). In the stowed position, the first and second sections 13a and 13b are collapsed longitudinally and folded against each other such that their undersides or bottom surfaces abut against each other and are oriented in a substantially vertical low profile arrangement relative to the vehicle doorway (see FIG. 17).

Figure 18:
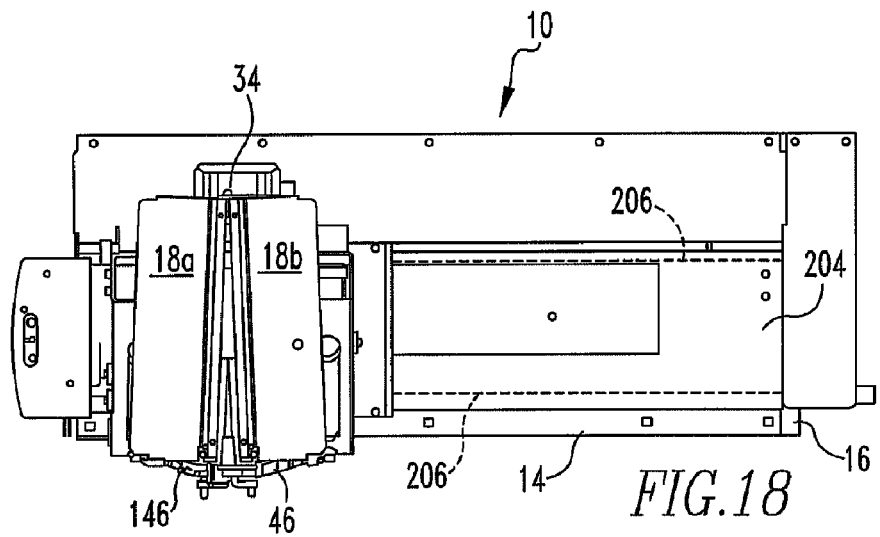
FIG. 18 is a top view of the powered wheelchair lift of FIG. 1 in the stowed position.
Figure 19:
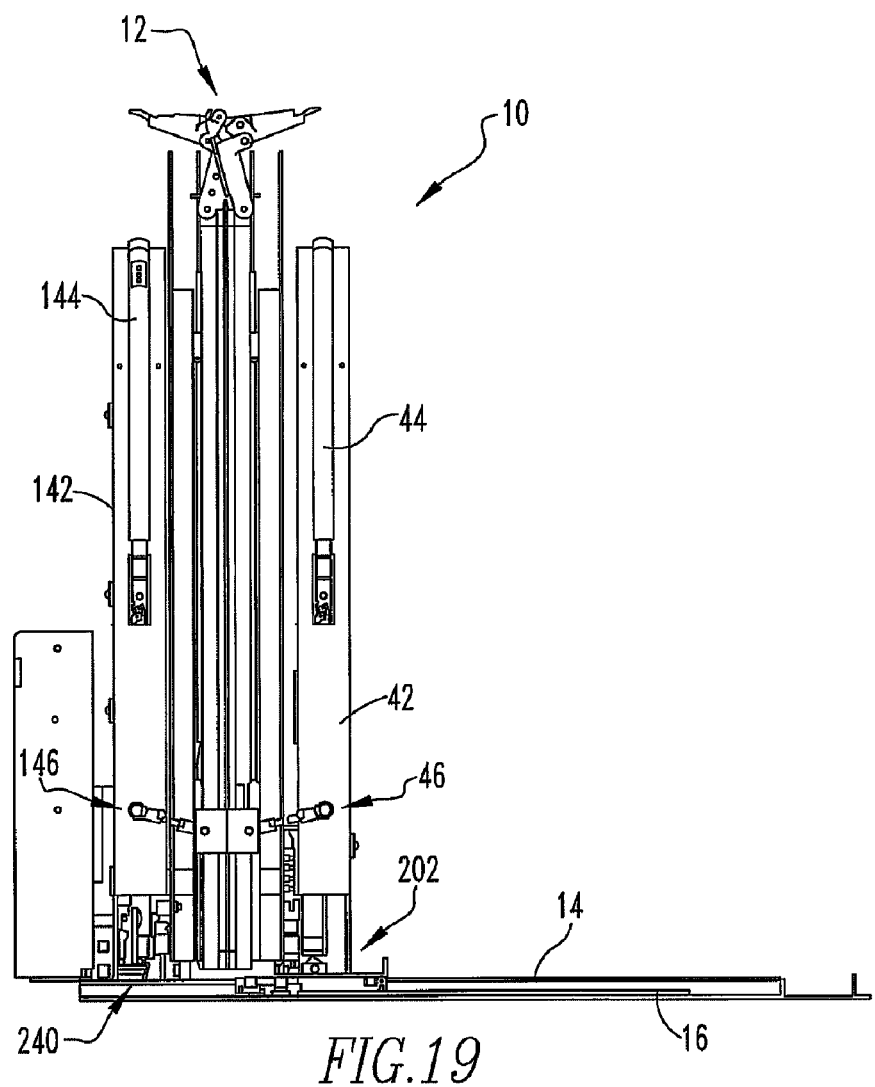
FIG. 19 is a front view of the powered wheelchair lift of FIG. 1 in the stowed position.
Figure 20:
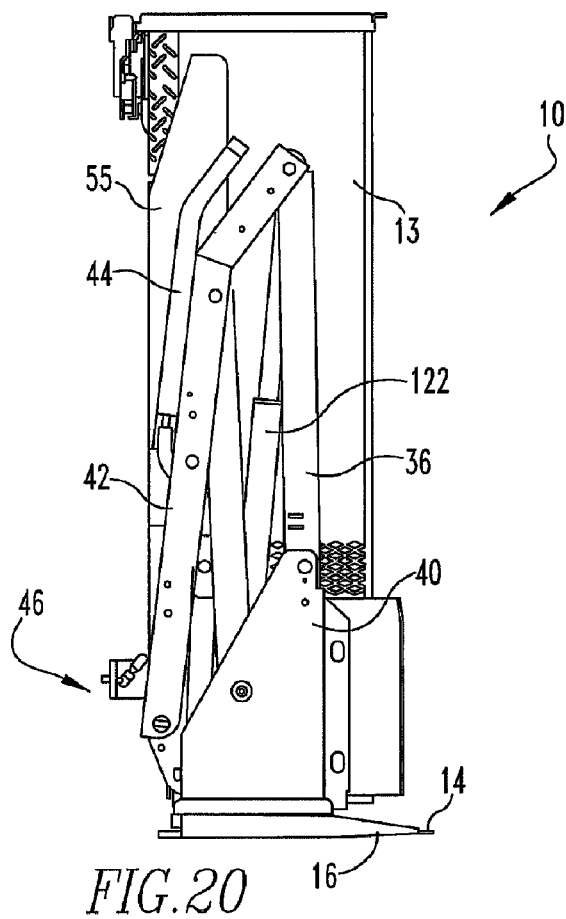
FIG. 20 is a right side view of the powered wheelchair lift of FIG. 1 in the stowed position.
Figure 21:
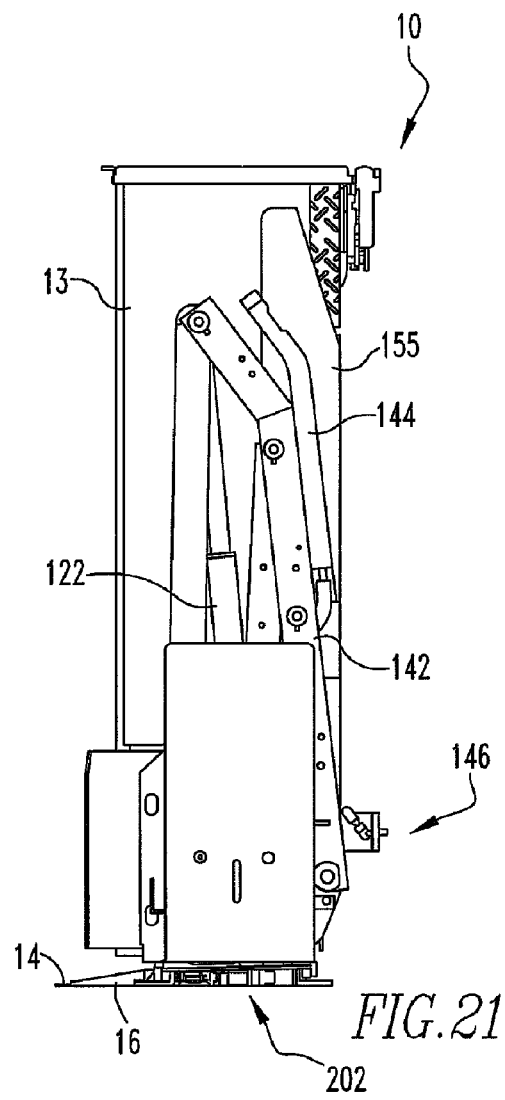
FIG. 21 is a left side view of the powered wheelchair lift of FIG. 1 in the stowed position.
Figure 27:
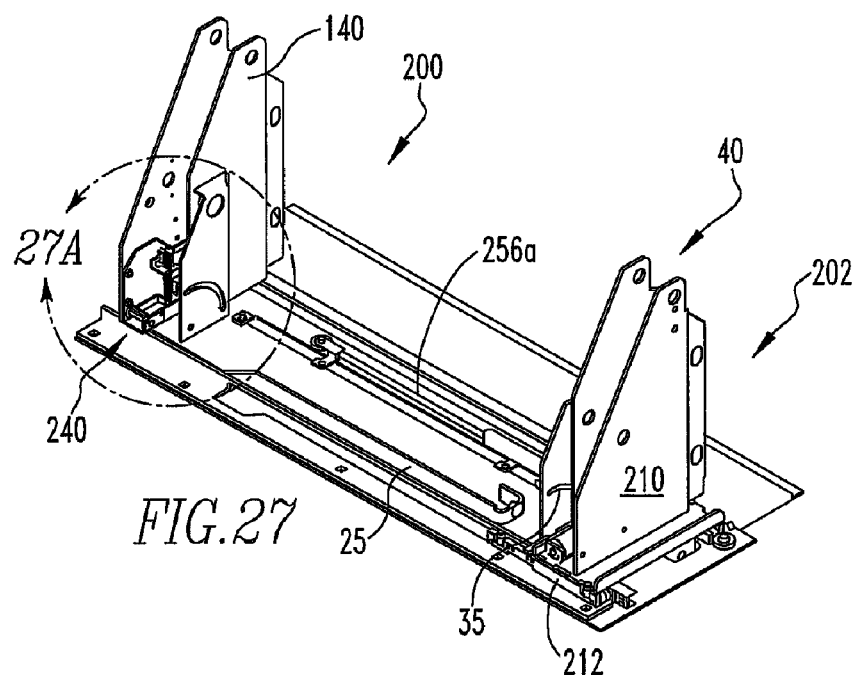
FIG. 27 is a perspective view of the track assembly and movable tower in accordance with an embodiment of the present invention.
Figure 27A:
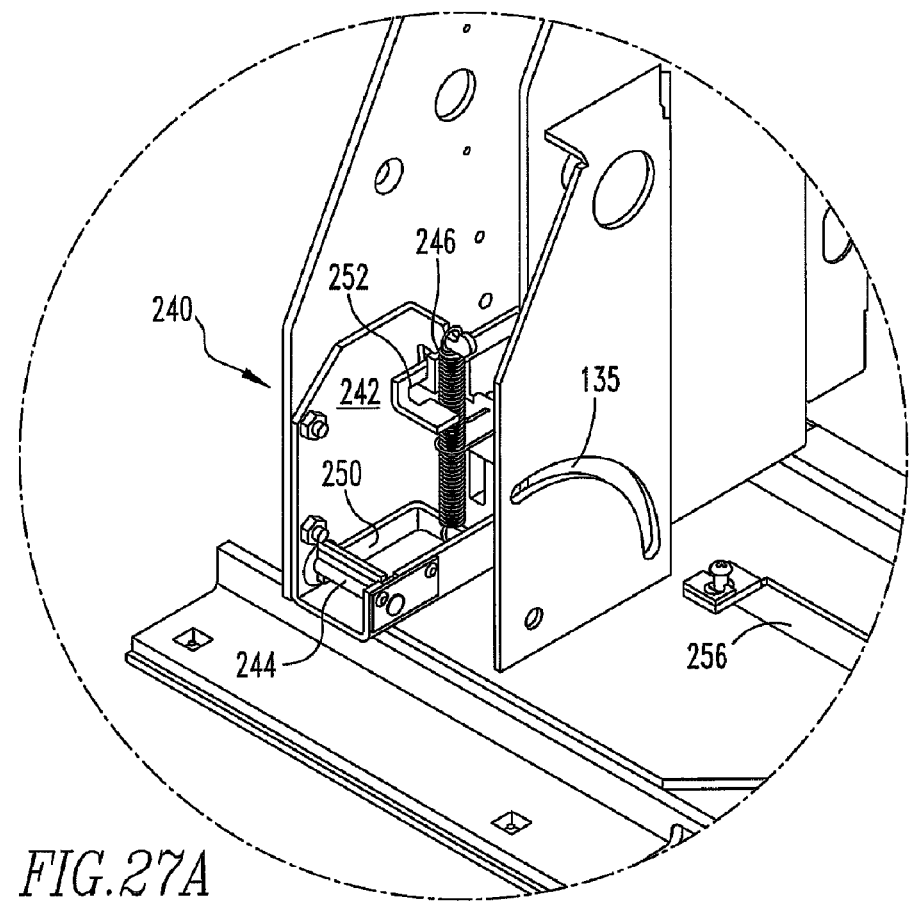
FIG. 27a is a detailed perspective view showing the stow lock mechanism in place.
Figure 28:
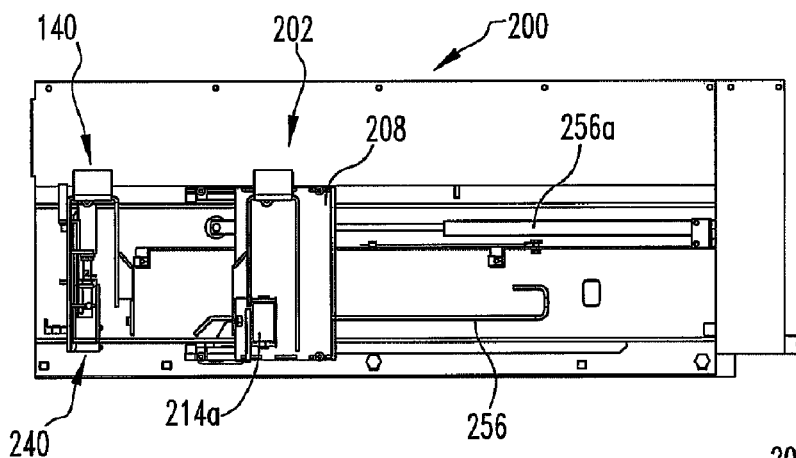
FIG. 28 is a top view of the track assembly and movable tower showing the movable tower after it has been moved part way across the track assembly.

Referring to FIGS. 7-11, there is shown the present invention wheelchair lift 10 deployed at the floor level position (which is flush with the vehicle floor), thereby allowing the person in the wheelchair to roll on or off between the vehicle floor and the platform assembly 12 of the lift 10. At this position, the platform assembly 12 is unfolded such that the first and second sections 13a and 13b are substantially horizontal and in fully coplanar alignment to each other. A bridge plate 34 is used for bridging the gap space between the vehicle floor and the platform assembly 12 at the floor level. In a preferred embodiment, the bridge plate 34 is pivotally mounted to mounting bracket members 40 and 140, via arcuate slots 35 and 135 (as shown in FIGS. 27 and 27a) defined in a plate fastened to the mounting bracket members 40 and 140. In an alternative embodiment, the bridge plate 34 can be mounted to anchor plate 16 or mounting assembly 14. It does not travel up and down with the platform 13 (however, it may in an alternative embodiment). It always stays at the vehicle floor level. When the platform 13 is stowed (as described below), the bridge plate pivots vertically, and folds into three sections to wrap around the platform 13 (as best shown in FIG. 18).

Referring to FIGS. 2-21, there are shown the pair of actuating linkage structures 26 and 126 in different states of actuation. For ease of understanding, only the actuating linkage structure 26 will be described in detail, since it should be understood that the actuating linkage structure 126 is identical and identical parts are numbered correspondingly with 100 added to each number.

The actuating linkage structure 26 includes a top actuating arm 36 and a bottom actuating arm 38 which are located substantially parallel to each other. The rear ends of the top and bottom actuating arms 36 and 38 are pivotally connected to a mounting bracket member 40. As is described more fully hereinbelow, mounting bracket member 40 is part of movable tower 202. Mounting bracket member 140 is secured to the anchoring plate 16 by conventional means. Each front end of the top and bottom actuating arms 36 and 38 are pivotally connected to an upper portion of an elongated vertical arm 42. A pair of opposite handrails 44 and 144 are provided with the present invention wheelchair lift 10 and move with respect to the extension and retraction of the hydraulic cylinder 122.

When the hydraulic cylinder 122 is extended, it causes the vertical arms 42 and 142 to move upwardly. It is this upward motion of the vertical arms 42 and 142 that moves the platform assembly 12 upwardly. When the hydraulic cylinder 122 is retracted, it causes the vertical arms 42 and 142 to move downwardly. It is this downward motion of the vertical arms 42 and 142 that moves the platform assembly 12 downwardly.

Figure 14:
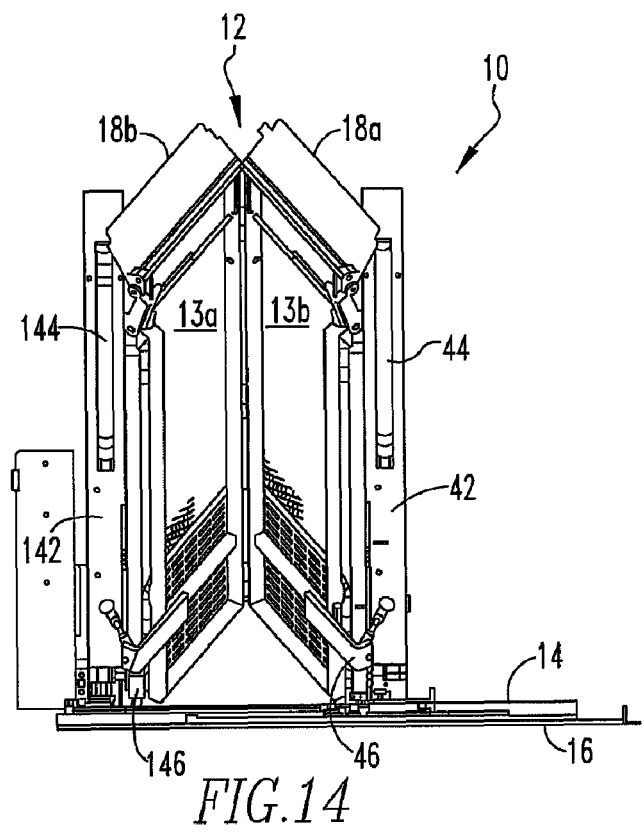
FIG. 14 is a front view of the powered wheelchair lift of FIG. 1 in the mid-stow position.
Figure 15:
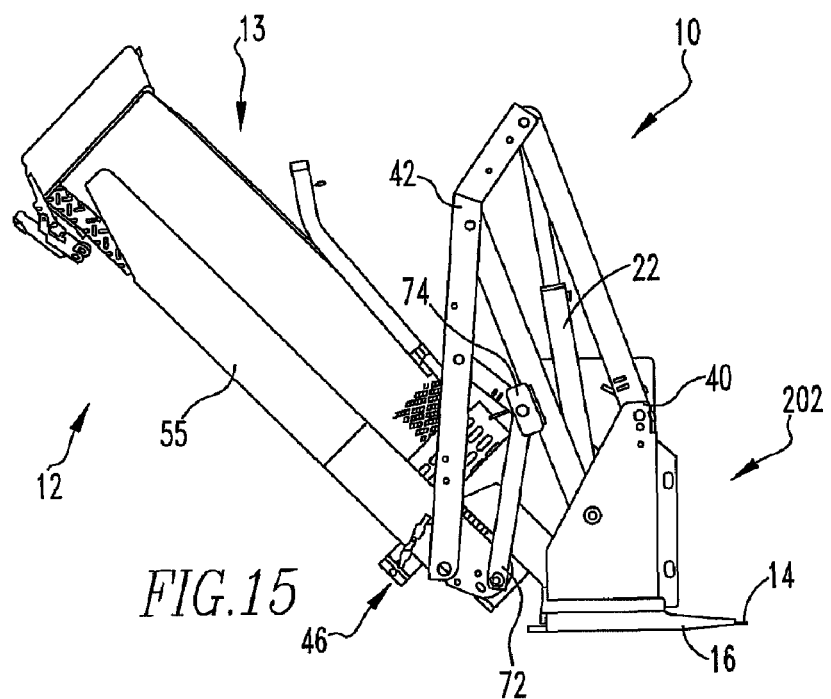
FIG. 15 is a right side view of the powered wheelchair lift of FIG. 1 in the mid-stow position.
Figure 16:
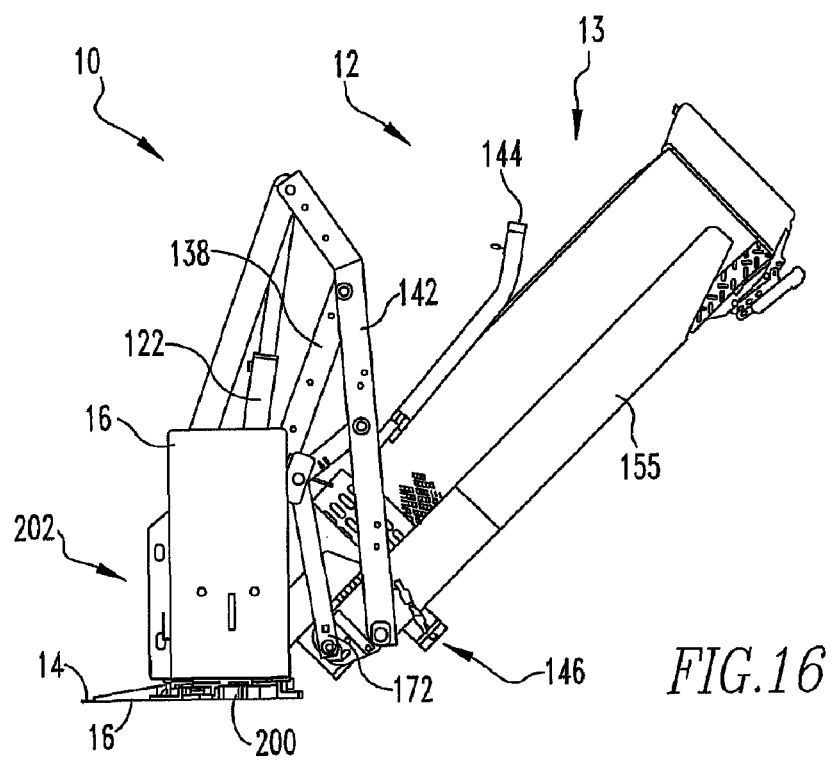
FIG. 16 is a left side view of the powered wheelchair lift of FIG. 1 in the mid-stow position.
Figure 17:
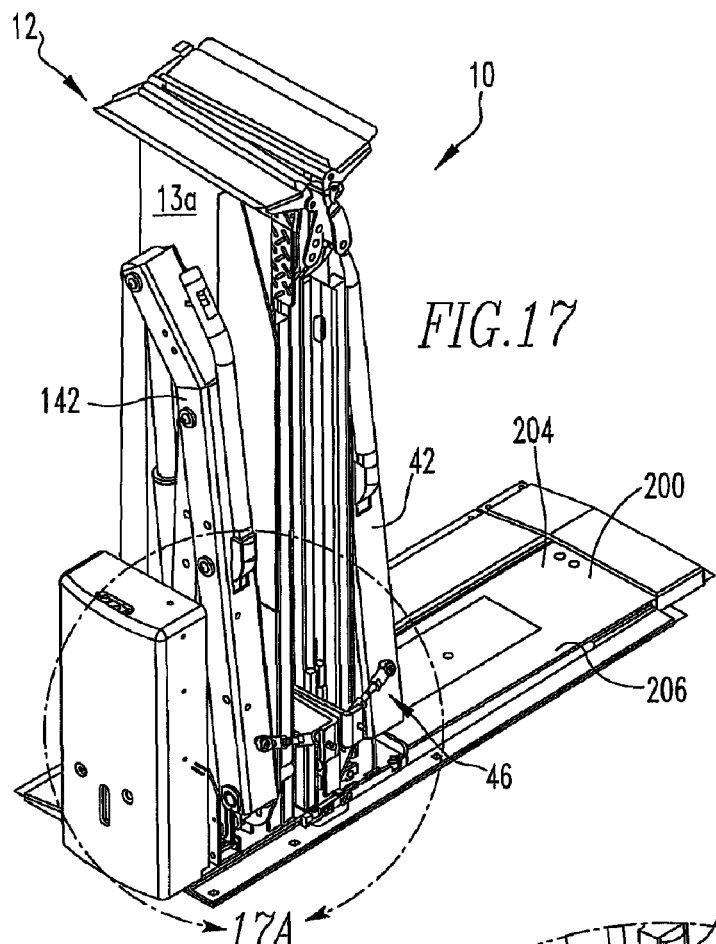
FIG. 17 is a perspective view of the powered wheelchair lift of FIG. 1, showing the foldable platform assembly when it is in a stowed position.
Figure 17A:
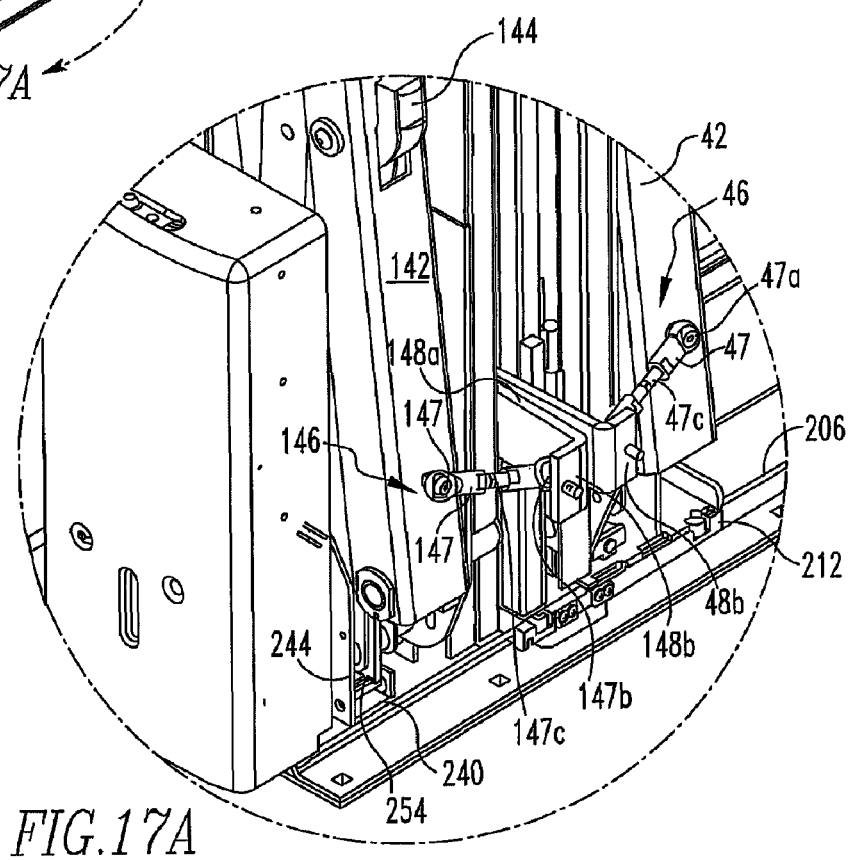
FIG. 17a is a perspective view showing the detail of the folding mechanism of the platform assembly.

Referring to FIGS. 14 and 17a, there is shown means for facilitating the unfolding and folding of the platform assembly 12. The means include a pair of opposite pivotable linkage assemblies 46 and 146, and a pair of opposite saddle assemblies 68 and 168. The pivotable linkage assemblies 46 and 146 (also referred to herein as the folding mechanism) are utilized for the movements of the platform assembly 12 between its stowed position (a substantially vertical and folded position) and its floor level position (a substantially horizontal and unfolded position). For ease of understanding, only the pivotable linkage assembly 46 and the saddle assembly 68 will be described since it should be understood that the pivotable linkage assembly 146 and the saddle assembly 168 are, respectively, identical and identical parts are numbered correspondingly with 100 added to each number.

The pivotable linkage assemblies 46 and 146 maintain the platform 13 in a horizontal position. In movement from the floor level position to the stowed position, pivotable linkage assemblies 46 and 146 are also, respectively, forcing the first and second platform sections 13a and 13b from a position where they lie in the same plane to a transverse position as seen in FIG. 17.

As best shown in FIG. 17a, pivotable linkage assembly 46 includes a turnbuckle 47 and a bracket 48. Turnbuckle 47 includes two socket and ball joints 47a and 47b and a rod 47c disposed therebetween and bracket 48 includes first portion 48a, which is secured to the bottom of the platform 13, and a second portion 48b that extends at a substantially right angle from first portion 48a. Socket and ball joint 47b is secured to second portion 48b of bracket 48. Socket and ball joint 47a is secured to elongated vertical arm 42. This arrangement allows an angular movement and a rotation of the bracket 48.

Figure 2:
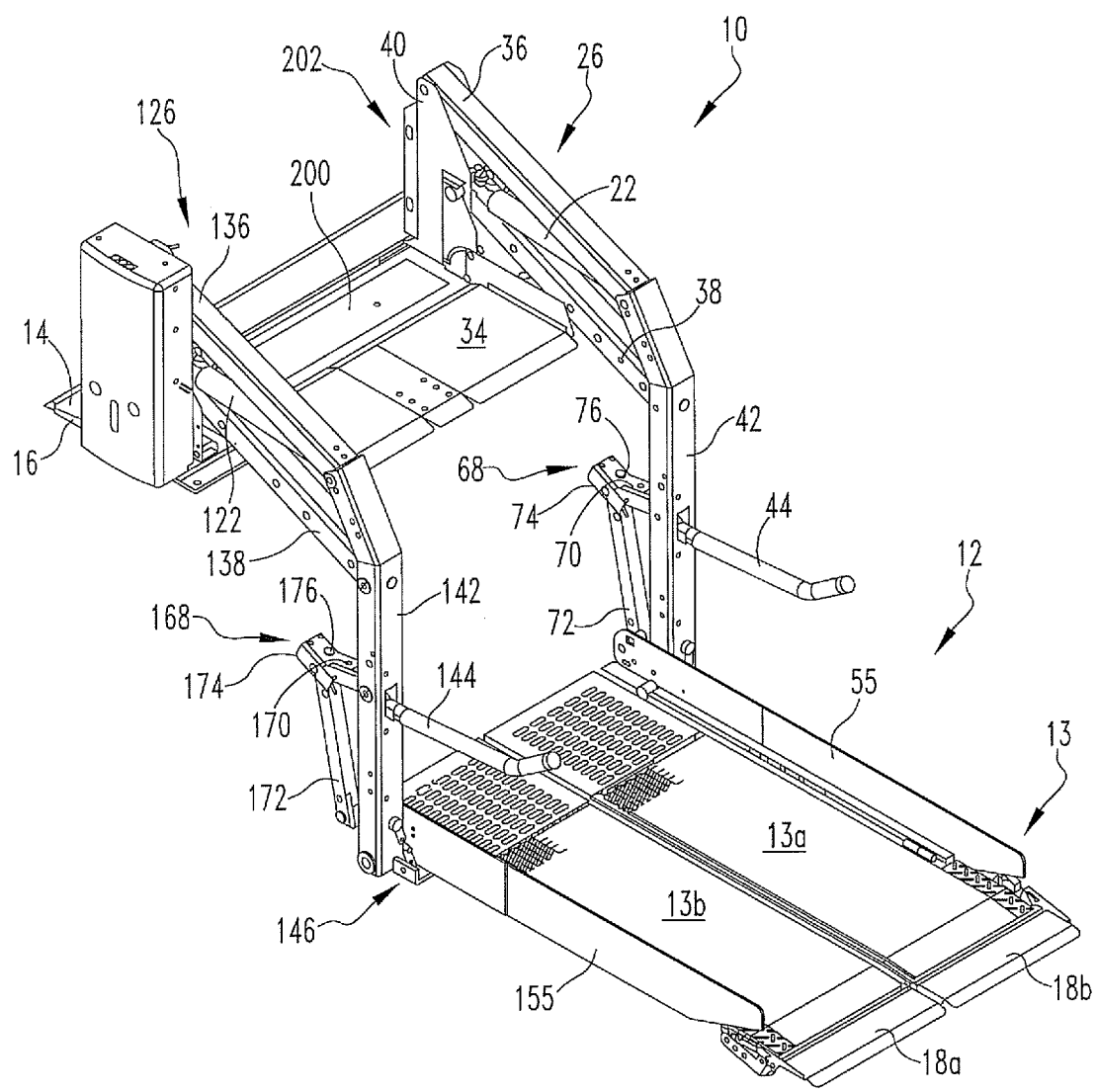
FIG. 2 is a perspective view of the powered wheelchair lift of FIG. 1, showing the foldable platform assembly when it is in a ground level position.
Figure 7:
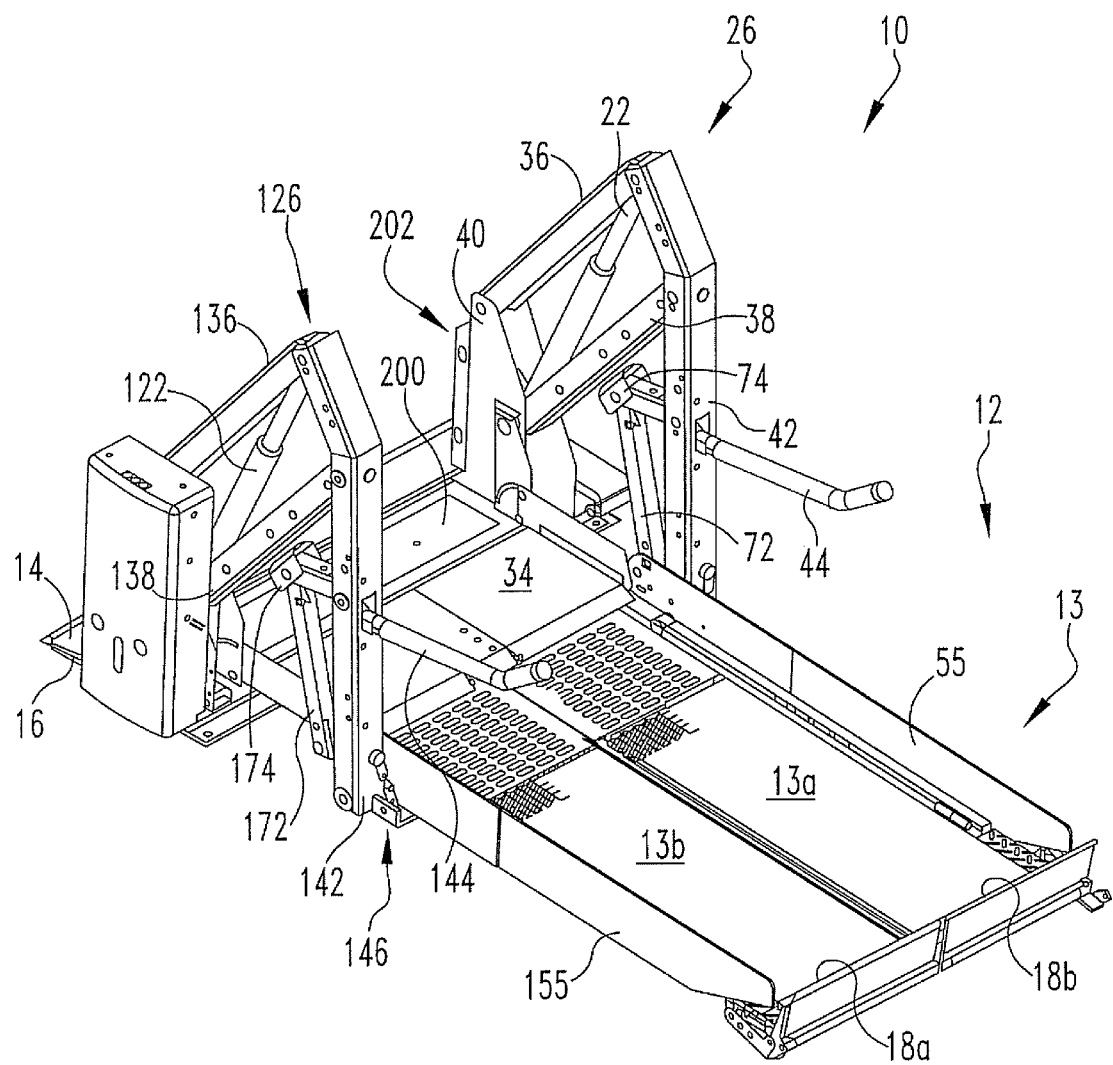
FIG. 7 is a perspective view of the powered wheelchair lift of FIG. 1, showing the foldable platform assembly when it is in a floor level position.
Figure 8:
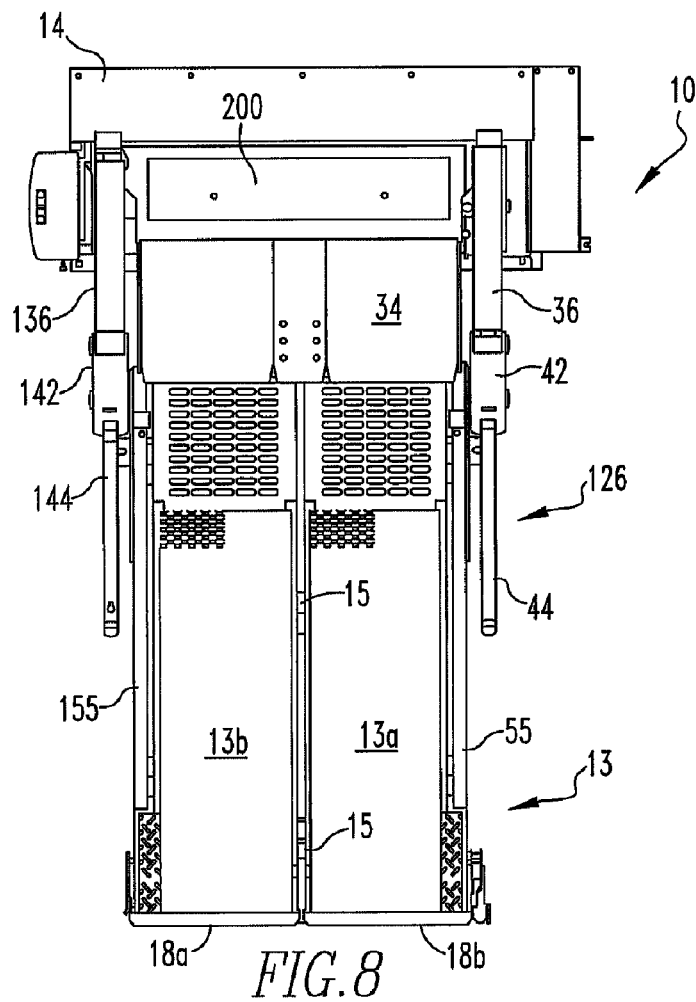
FIG. 8 is a top view of the powered wheelchair lift of FIG. 1 in the floor level position.
Figure 9:
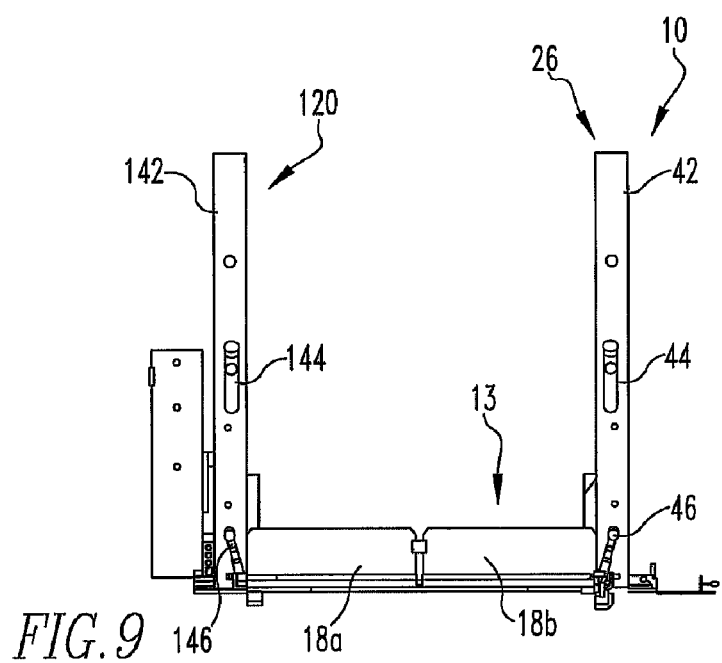
FIG. 9 is a front view of the powered wheelchair lift of FIG. 1 in the floor level position.
Figure 12:
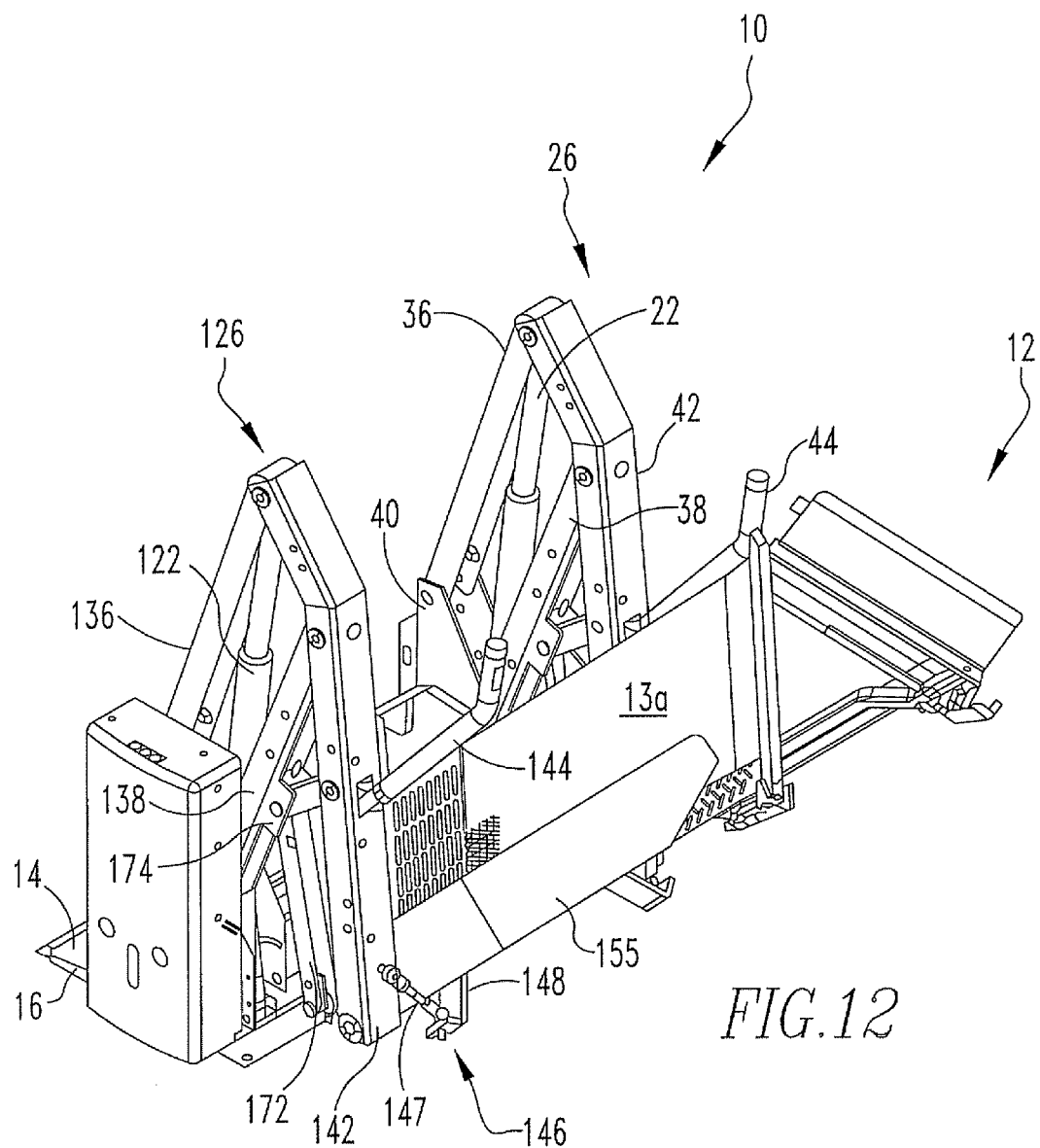
FIG. 12 is a perspective view of the powered wheelchair lift of FIG. 1, showing the foldable platform assembly when it is in a mid-stow position.
Figure 13:
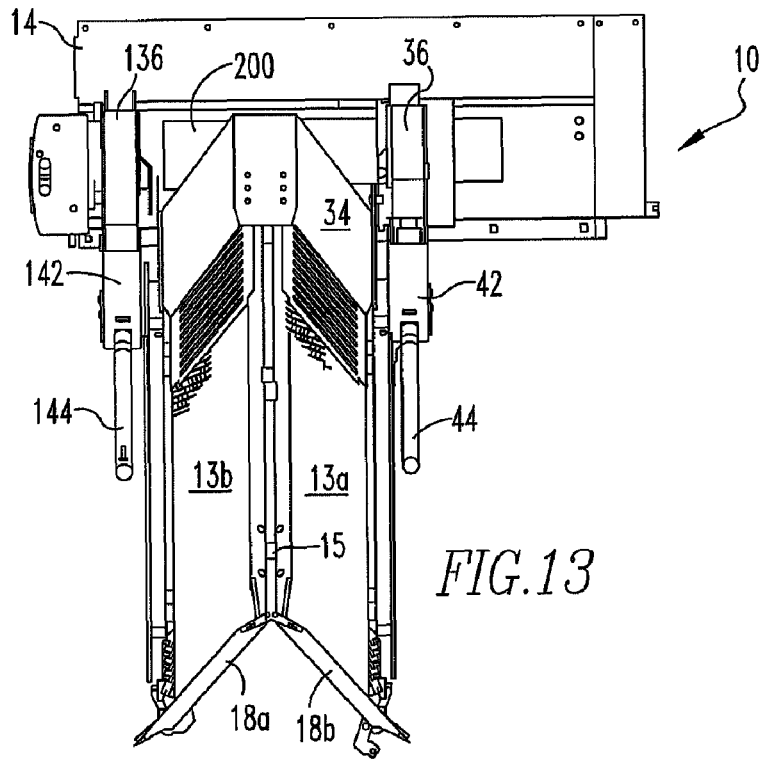
FIG. 13 is a top view of the powered wheelchair lift of FIG. 1 in the mid-stow position.

The saddle assembly 68 includes a substantially horizontal knuckle link 70, a substantially vertical knuckle link 72, and a saddle block 74. One end of the horizontal knuckle link 70 may be connected to the elongated vertical arm 42 while the other end is pivotally connected to the saddle block 74. One end of the vertical knuckle link 72 is pivotally connected to the horizontal knuckle link 70 and the saddle block 74 while the other end is pivotally connected to the rear end of the platform 13. The saddle block 74 may have a smooth contacting surface or have a knuckle piece 76 as shown in FIG. 2 for engaging with an opening underneath the bottom actuating arm 38 when the lift moves between the floor level position and the stowed position.

By this arrangement, the motions of the platform assembly 12 are well controlled and especially prevent the platform assembly 12 from free falling or free deploying movement during the lift's swing-up and swing-down motions. When the platform assembly 12 is away from its entry position to the ground level position (see FIG. 2), the knuckle pieces 76 and 176 are disengaged with the underneath sides of the bottom actuating arms 38 and 138. It will be appreciated that the present invention is not limited to the saddle assemblies 68 and 168. It is emphasized that while the saddle assemblies are the preferred embodiments, it is also within the spirit and scope of the present invention to utilize roller assemblies (not shown).

As the platform assembly 12 is lifted up from its floor level position toward its stowed position, the saddle blocks 74 and 174 or the knuckle pieces 76 and 176 come into contact with the bottom actuating arms 38 and 138 which push down the vertical knuckle links 72 and 172, and the platform 13 is raised through the pivot connection. As this happens, the pivotable linkage assemblies 46 and 146 cause the first and second platform sections 13a and 13b to start to fold. Because the pivotable linkage assemblies 46 and 146 are not flexible, the platform sections 13a and 13b have to pivot, as shown in the mid-stow position in FIGS. 12-16. This action happens because as the platform 13 starts to pivot upwardly from a horizontal position, the socket and ball joints 47a and 47b start approaching each other as a result of the angle created. This causes the turnbuckle 47 to push against the bracket 48 and swing it in. In other words, the turnbuckle rod 47c would have to shrink (if it could) in order for the platform sections to remain coplanar. But, because rod 47c is rigid, it pushes on the bracket 48 and, geometrically described, the end of the bracket 48 traces an arc on the surface of a sphere. Because the bracket 48 is secured to platform section 13b, the platform section 13b follows this same path (as does platform section 13a and bracket 148), thereby causing the platform 13 to fold.

As the platform assembly 12 is raised by the linkage assembly, the pivotable linkage assemblies 46 and 146 cause the platform sections 13a and 13b to fold along the longitudinally-oriented fold (preferably made pivotable by hinges 15). As this happens, the first elongated vertical arm 42 is pulled toward the second elongated vertical arm 142, thereby shortening the distance between the two arms 42 and 142. In another embodiment, the lift may include means for pushing the first vertical arm 42 toward the second vertical arm 142, thereby causing the platform sections 13a and 13b to fold.

As described, the folding action of the first and second platform sections 13a and 13b causes parallelogram-actuating linkage structure 26 to move inwardly toward parallelogram-actuating linkage structure 126. This is possible because parallelogram-actuating linkage structure 26, via movable tower 202, is movably or slidably connected to mounting assembly 14 (including anchor plate 16), which is described below. This provides an automatic stowing of the platform assembly 12.

In a preferred embodiment, as is shown in FIG. 2, platform 13 includes side panels 55 and 155 affixed to the outer peripheral edges thereof. The side panels 55 and 155 prevent the wheelchair from rolling off the sides of the platform 13. In a preferred embodiment, the side panels 55 and 155 are pivotally connected (e.g., by a hinge) to the platform sections 13a and 13b. However, they also may be rigidly connected thereto. Also, it should be pointed out that the height of the side panels 55 and 155 may differ.

FIGS. 22-31 show the details of the track assembly 200 and movable tower 202. It will be understood that any method for moving elongated vertical arm 42 toward elongated vertical arm 142 is within the scope of the present invention. Those skilled in the art will be able to make numerous modifications to the embodiments described herein to provide movement of the elongated vertical arms 42 and 142 and the associated parallelogram-actuating linkage structures 26 and 126.

Figure 22:
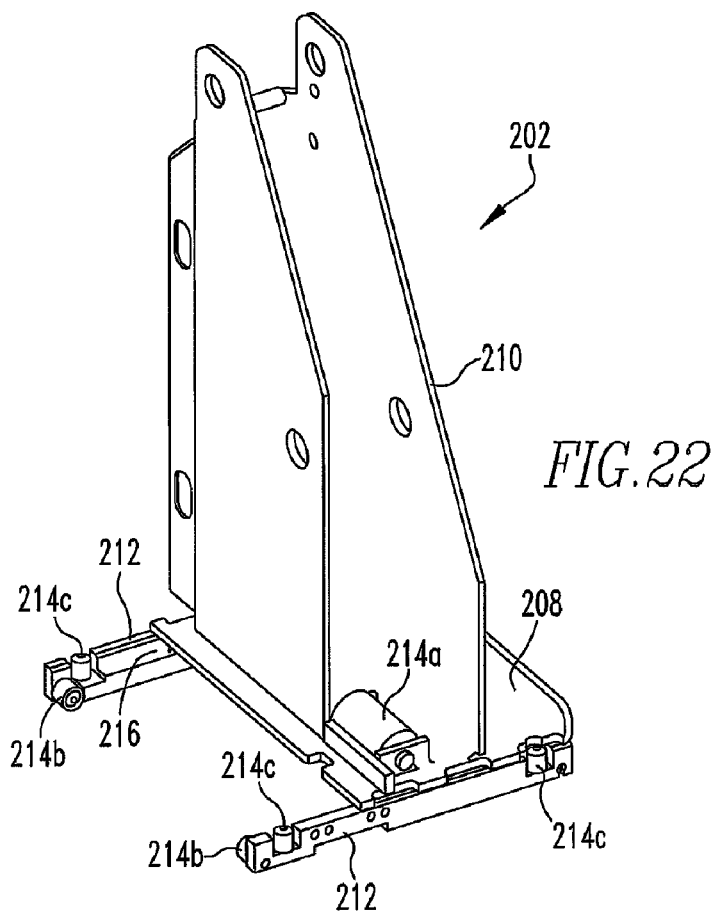
FIG. 22 is a perspective view of a movable tower in accordance with an embodiment of the present invention.
Figure 23:
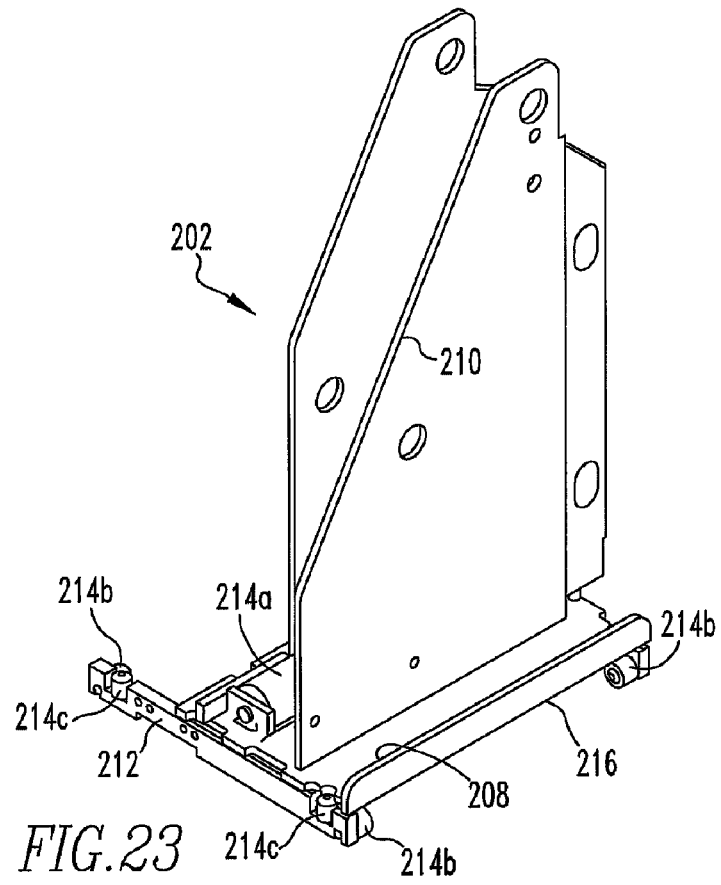
FIG. 23 is another perspective view of the movable tower of FIG. 22 from the opposite side.
Figure 24:
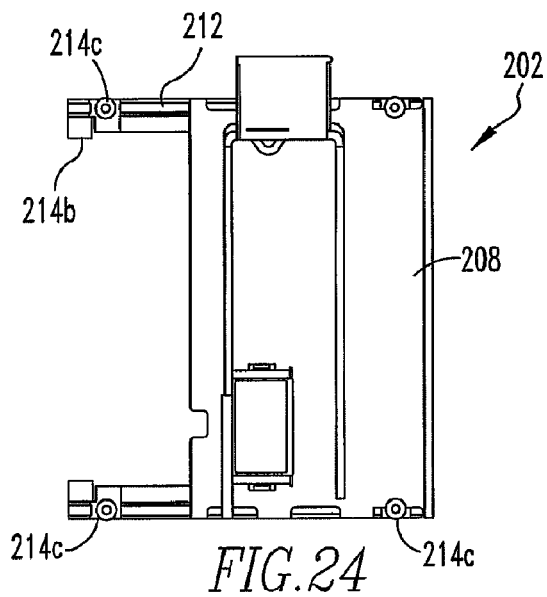
FIG. 24 is a top view of the movable tower of FIG. 22.
Figure 25:
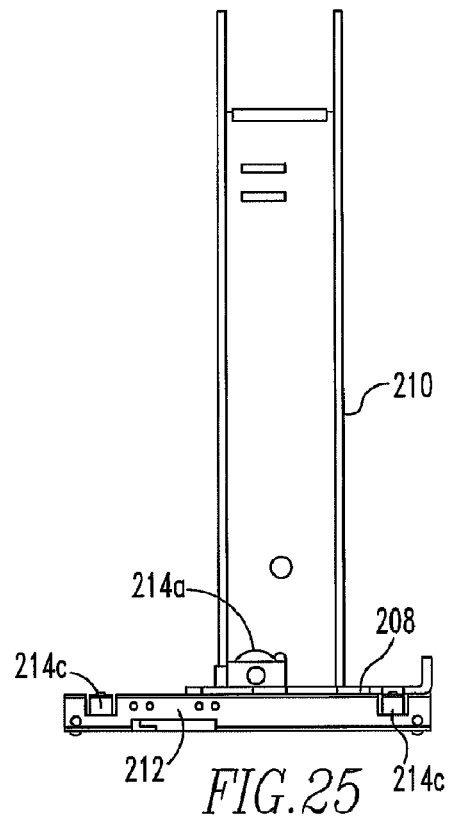
FIG. 25 is a front view of the movable tower of FIG. 22.
Figure 26:
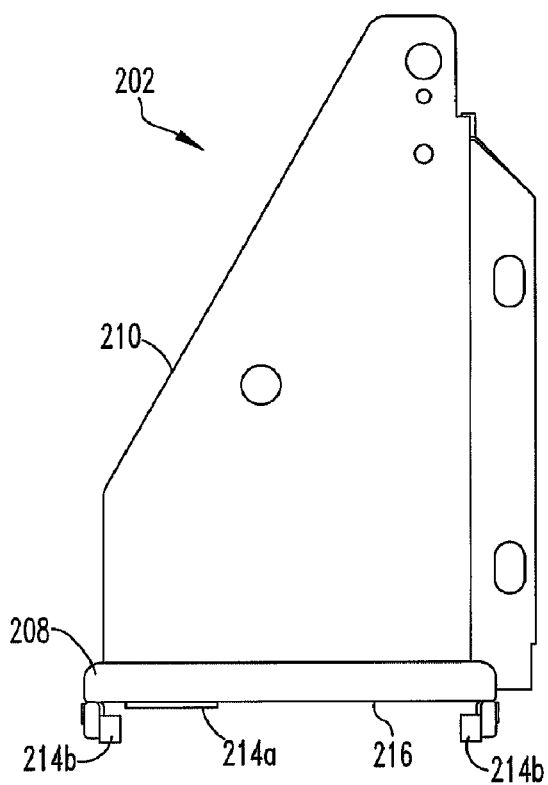
FIG. 26 is a left side view of the movable tower of FIG. 22.

Accordingly, in a preferred embodiment, elongated vertical arm 42 is movable via track assembly 200 in cooperation with movable tower 202 (best shown in FIG. 22). The track assembly 200 includes anchoring plate 16, top plate 204, which is spaced from anchoring plate 16, and tracks 206. It will be understood, that in a preferred embodiment, the tracks 206 are part of the top plate 204, as described more fully hereinbelow. In FIGS. 27-31, the top plate 204 (and therefore the tracks 206) have been omitted to show the detail inside the mounting assembly 14 and track assembly. The top plate 204 is shown in FIG. 31.

Figure 29:
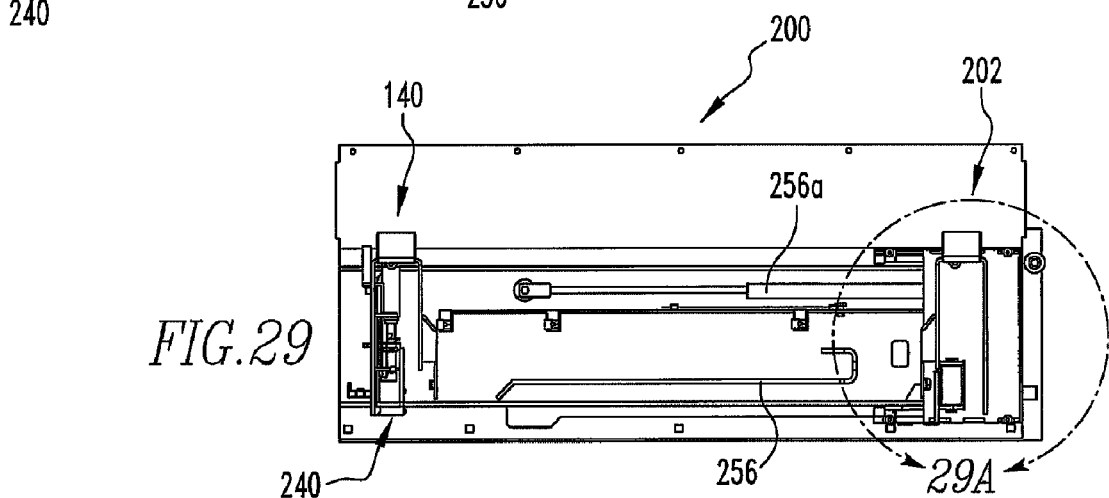
FIG. 29 is a top view of the track assembly and movable tower with the movable tower in its outermost position on the track assembly.
Figure 29A:
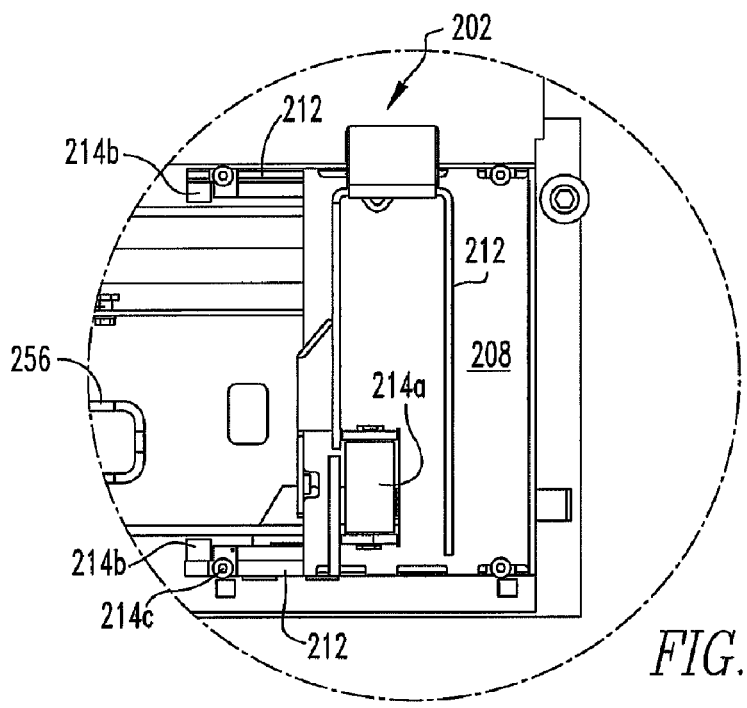
FIG. 29a is a detailed top view of the movable tower in its outermost position on the track assembly.

In FIGS. 29 and 30a, portions of a hose retraction system 256 can be seen. This system prevents the hydraulic hose (not shown) that connects the hydraulic cylinder 22 to the hydraulic pump (not shown) from tangling while the movable tower moves. The hose retraction system includes a pneumatic cylinder 256a or gas spring and a number of other components that will be readily familiar to those skilled in the art. Accordingly, the details of the hose retraction system will not be described herein. It will be understood that any components labeled 256 in the figures are a part of the hose retraction system.

The movable tower 202 includes base plate 208, frame 210, arms 212, and a plurality of rollers 214. The rollers will be designated herein as large horizontal roller 214a, small horizontal rollers 214b and small vertical rollers 214c. The moveable tower 202 also defines a slot 216 that receives the top plate 204 and tracks 206.

The track assembly includes top plate 204, which incorporates the tracks 206. In FIG. 18, dashed lines have been added to show the portion of the top plate 204 that is used as the track 206 for the rollers 214. The interaction of the rollers 214 and track 216 is similar to the interaction of rollercoaster wheels and their associated track. In operation, small vertical rollers 214c ride against the side edge of top plate 204 (as can be seen in FIGS. 17a and 30a), small horizontal rollers 214b ride against the underside of top plate 204 (as can be seen in FIG. 30a), and the large horizontal roller 214a rides on the top of top plate 204 (as can be seen in FIG. 30a). This allows the moving tower 202 to travel from one end of the track assembly 200 to the other. As is described above, this rolling movement takes place when the platform 13 is folded and pulls the first vertical arm 42, and, therefore, the moving tower 202 inwardly.

It will be understood that any method for collapsing the first and second elongated vertical arms 42 and 142 is within the scope of the present invention. For example, as described above, elongated vertical arm 42 may be movable toward elongated vertical arm 142 (or the first and second elongated vertical arms may be movable toward one another) via rollers, a track, sliding, a foldable mechanism, telescoping members, etc. Furthermore, it is anticipated that this collapsing can be done manually or automatically, for example, hydraulically, electrically, pneumatically, etc. The platform 13 may include more than two foldable sections.

Figure 32:
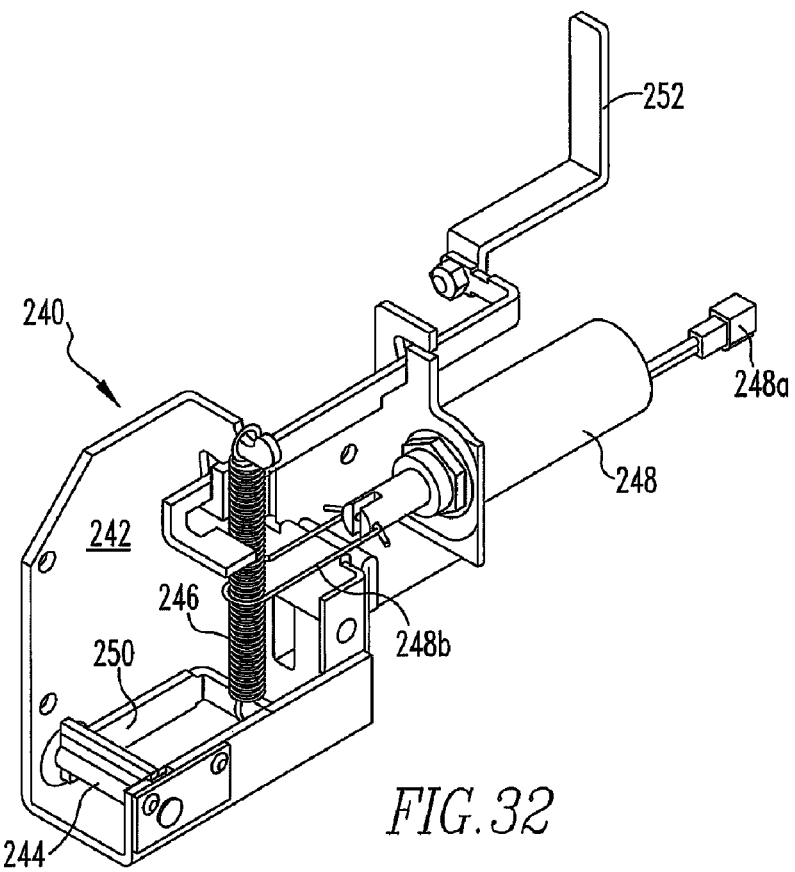
FIG. 32 is a perspective view of the stow lock mechanism in accordance with an embodiment of the present invention.
Figure 33:
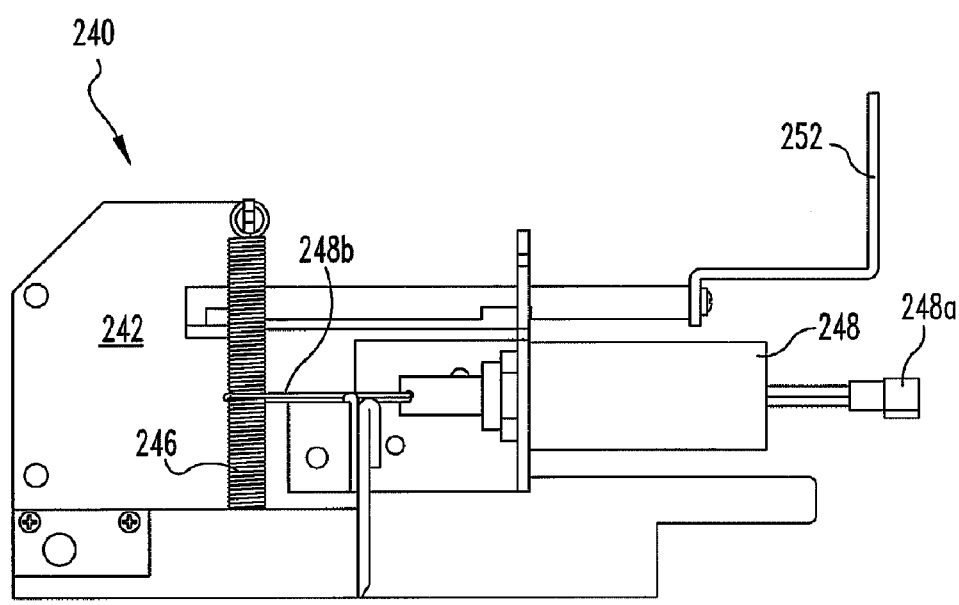
FIG. 33 is a left side view of the stow lock mechanism of FIG. 32.

Referring to FIGS. 17a, 32 and 33, the stow lock mechanism 240 is shown. The stow lock mechanism 240 secures the platform assembly 12 in place when it is in the stowed position. It will be understood that any type of locking mechanism that keeps the platform assembly 12 from drifting or unfolding is within the scope of the present invention. In a preferred embodiment, the stow lock mechanism of FIG. 32 is used. The stow lock mechanism 240 preferably includes a frame 242, paddle wheel 244, spring 246, solenoid 248, lock member 250 and a lever 252. As can be seen in FIG. 17a, vertical arm 142 includes a plurality of ratchet teeth 254 extending therefrom. The ratchet teeth 254 engage corresponding teeth on the paddle wheel 244. The paddle wheel is prevented from turning by lock member 250. This holds the platform assembly 12 in place.

To unlock the platform assembly 12, the spring 246 is deformed or pulled, thereby causing columnar failure that pulls the lock member 250 (to which the bottom of spring 246 is attached). A portion of lock member 250 is in contact with and extends under the paddle wheel 244. When lock member 250 is moved by spring 246, it is no longer engaged with the paddle wheel 244, thereby allowing paddle wheel 244 to turn. Once it turns, the ratchet teeth 254 disengage with the paddle wheel teeth, thus unlocking the platform assembly 12.

The spring 246 can be deformed in one of two ways, by the solenoid 248, when electric power is present, and by the lever 252, when electric power is not present (or at any other time that a user wants to unlock the platform assembly manually). To unlock the platform assembly 12 using the lever 252, a user pulls on the lever, thereby deforming the spring 246 and unlocking the platform assembly 12 as described above. As for the solenoid 248, it is actuated by the power-actuating system (see plug 248a, which connects to the power-actuating system). When actuated, a U-clip 248b pulls on and deforms the spring to unlock the platform assembly 12 and linkage assembly. In a preferred embodiment, the solenoid 248 includes a coil spring (not shown) for positively returning the plunger to its starting position.

The present invention wheelchair lift 10 has a unique motion pattern. From the stowed position to the floor level position, the lift 10 deploys from a substantially vertical position to a substantially horizontal position along with the unfolding movement of the platform assembly 12 from a fully folded condition to a fully unfolded condition. From the floor level position to the ground level position, the lift 10 moves downwardly along an arc path while the platform assembly 12 keeps its unfolded and substantially horizontal condition. When the lift 10 moves back from the ground level position to the stowed position, it goes through the reverse motions.

Defined broadly, the present invention is a wheelchair lift for use in conjunction with a vehicle having an opening and a floor, the wheelchair lift comprising: (a) a power-actuating system; (b) a platform assembly having at least two plates pivotally connected along their longitudinal adjacent edges; (c) a linking assembly connected to the power-actuating system and the platform assembly for automatically moving the platform assembly from a stowed position inside the vehicle to a floor level position at the vehicle opening and inversely, and moving the platform assembly from the floor level position to a ground level position outside the vehicle and inversely; and (d) means for automatically facilitating the unfolding of the at least two plates of the platform assembly in a longitudinal direction as the platform assembly is moving between the stowed position to the floor level position, and also automatically folding of the at least two plates of the platform assembly in the longitudinal direction as the platform assembly is moving between the floor level position to the stowed position; (e) whereby the platform assembly can be automatically unfolded and deployed at the floor level position in a substantially horizontal orientation, and further moved to the ground level position in the unfolded condition and inversely, and automatically folded and stowed at the stowed position to form a vertically low profile arrangement in a substantially vertical orientation adjacent to the vehicle opening.

Defined more broadly, the present invention is a wheelchair lift for use in conjunction with a vehicle having an opening, the wheelchair lift comprising a power-actuating system and a foldable platform assembly having at least two plates pivotally connected at their longitudinal adjacent edges which automatically unfold during a swing-down deployment motion of the platform assembly, and also automatically fold during a swing-up stowaway motion of the platform assembly actuated by the power-actuating system to form a vertical low profile arrangement (as shown in FIG. 17) adjacent to the opening.

Of course, the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the Patent Laws by providing full public disclosure of at least one of its forms. However, such detailed description is not intended in any way to limit the broad features or principles of the present invention, or the scope of patent monopoly to be granted.

The invention claimed is:

1. A method of stowing a wheelchair lift in a vehicle having a floor, the method comprising the steps of: a. providing a wheelchair lift having a power-actuating system, a platform assembly and a linking assembly connecting the power-actuating system to the platform assembly, wherein the platform assembly comprises first and second platform sections and the linking assembly has first and second vertical arms connected to the first and second platform sections, respectively, of the platform assembly; and b. moving the platform assembly from a floor level position to a stowed position while simultaneously moving at least one of the first and second vertical arms in a lateral direction with respect to the other of the first and second vertical arms and folding the first and second sections of the platform assembly together along a longitudinally-oriented fold perpendicular to an extended edge of the vehicle floor, wherein one of the vertical arms moves laterally with respect to the extended edge of the vehicle floor and toward the other vertical arm during the folding of the first and second sections along the longitudinally-oriented fold.

2. The method of claim 1, wherein the first and second vertical arms are a first distance apart before the folding process and a second distance apart after the folding process, wherein the second distance is lesser than the first distance.

3. The method of claim 1, wherein the platform assembly includes first and second platform sections that are pivotally connected along longitudinally adjacent edges.

4. A method of stowing a wheelchair lift in a vehicle having a floor, the method comprising the steps of: a. providing a wheelchair lift having a power-actuating system, a platform assembly and a linking assembly connecting the power-actuating system to the platform assembly wherein the platform assembly comprises first and second platform sections and the linking assembly has first and second vertical arms connected to the platform assembly; and first and second fold-facilitating links connected to the first and second vertical arms, respectively, and the first and second platform sections; and b. moving the platform assembly from a floor level position to a stowed position while simultaneously folding the first and second sections of the platform assembly together along a longitudinally-oriented fold perpendicular to an extended edge of the vehicle floor, wherein, during the folding process the first and second fold-facilitating links cause the first platform section to pivot with respect to the second platform section and the first vertical arm to move with respect to the second vertical arm.

5. A method of stowing a wheelchair lift in a vehicle having a floor, the method comprising the steps of: a. providing a wheelchair lift having a power-actuating system, a platform assembly and a linking assembly connecting the power-actuating system to the platform assembly, wherein the platform assembly comprises first and second platform sections and the linking assembly has first and second vertical arms connected to the first and second platform sections, respectively, of the platform assembly; and b. moving the platform assembly from a floor level position to a stowed position while simultaneously moving at least one of the first and second vertical arms in a lateral direction with respect to the other of the first and second vertical arms and folding the first and second sections of the platform assembly together along a longitudinally-oriented fold perpendicular to an extended edge of the vehicle floor, wherein one of the vertical arms is pulled laterally with respect to the extended edge of the vehicle floor and toward the other vertical arm during the folding process.

* * * * *